United States Patent
Fujiki

(10) Patent No.: US 10,354,687 B2
(45) Date of Patent: Jul. 16, 2019

(54) RECORDING ADJUSTMENT DEVICE, RECORDING ADJUSTMENT METHOD, AND PROGRAM

(71) Applicant: SONY CORPORATION, Tokyo (JP)

(72) Inventor: Toshihiro Fujiki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/774,029

(22) PCT Filed: Jan. 6, 2017

(86) PCT No.: PCT/JP2017/000206
§ 371 (c)(1),
(2) Date: May 7, 2018

(87) PCT Pub. No.: WO2017/126330
PCT Pub. Date: Jul. 27, 2017

(65) Prior Publication Data
US 2018/0330752 A1    Nov. 15, 2018

(30) Foreign Application Priority Data

Jan. 21, 2016  (JP) ................... 2016-009696

(51) Int. Cl.
*G11B 7/125*  (2012.01)
*G11B 20/10*  (2006.01)
(Continued)

(52) U.S. Cl.
CPC ............ *G11B 7/00456* (2013.01); *G11B 7/00* (2013.01); *G11B 7/0045* (2013.01);
(Continued)

(58) Field of Classification Search
CPC ............. G11B 20/10009; G11B 27/24; G11B 20/10037; G11B 27/3027;
(Continued)

(56) References Cited

U.S. PATENT DOCUMENTS 9,570,102 B2 *  2/2017  Kobayashi ....... G11B 20/10009
2002/0001275 A1  1/2002  Tanaka et al.
2012/0002527 A1  1/2012  Minemura et al.

FOREIGN PATENT DOCUMENTS

EP  0477892 A2  4/1992
JP  H05-290437 A  11/1993
(Continued)

OTHER PUBLICATIONS

Dec. 11, 2018, European Search Report issued for related EP Application No. 17741210.3.

*Primary Examiner* — Nabil Z Hindi
(74) *Attorney, Agent, or Firm* — Paratus Law Group, PLLC

(57) ABSTRACT

There is provided a recording adjustment device, a recording adjustment method, and a program of which enables recording compensation for an optical disc for a high-linear density to be realized. The recording adjustment device according to an embodiment of the present technique executes filter processing on the basis of a regenerative signal obtained by reproducing data recorded in a recording medium, and a recording pattern of marks and spaces of the data, identifies an impulse response of a system, calculates a difference in amplitude between an output from the filter processing after the identification of the impulse response and the regenerative signal every edge type, and detects a slope of a step response in the vicinity of an edge position.

9 Claims, 21 Drawing Sheets

(51) Int. Cl.
  *G11B 7/0045* (2006.01)
  *G11B 7/00* (2006.01)
(52) U.S. Cl.
  CPC .. *G11B 20/10046* (2013.01); *G11B 20/10407* (2013.01); *G11B 20/10462* (2013.01); *G11B 2220/2541* (2013.01)
(58) Field of Classification Search
  CPC ........ G11B 20/10203; G11B 20/10231; G11B 7/125; G11B 20/10407
  USPC ........... 369/59.1, 59.12, 59.15, 59.17, 59.13, 369/59.2, 59.21
  See application file for complete search history.

(56) References Cited

FOREIGN PATENT DOCUMENTS

| | | |
|---|---|---|
| JP | 2002-008237 A | 1/2002 |
| JP | 2011-023069 A | 2/2011 |
| WO | WO 2010/064305 A1 | 6/2010 |
| WO | WO 2010/103742 A1 | 9/2010 |
| WO | WO 2011/132381 A1 | 10/2011 |

* cited by examiner

FIG.16

| SUCCESSION \ ANTECEDENCE | 2m2s | 2m3S | 3m | 4m | 5M |
|---|---|---|---|---|---|
| 2s | | | | | |
| 3s | | | dTtop | | |
| 4s | | | | | |
| 5S | | | | | |

~T1

| SUCCESSION \ ANTECEDENCE | 2m2s | 2m3S | 3m | 4m | 5M |
|---|---|---|---|---|---|
| 2s | | | | | |
| 3s | | | Ttop | | |
| 4s | | | | | |
| 5S | | | | | |

~T2

| ANTECEDENCE \ SUCCESSION | 3m | 4m | 5M |
|---|---|---|---|
| 2s | | | |
| 3s | | | |
| 4s | | dtc | |
| 5S | | | |

~T3

| ANTECEDENCE \ SUCCESSION | 2s2m | 3S2m | 3m | 4m | 5M |
|---|---|---|---|---|---|
| 2s | | | | | |
| 3s | | | dts | | |
| 4s | | | | | |
| 5S | | | | | |

~T4

RECORDING ADJUSTMENT DEVICE, RECORDING ADJUSTMENT METHOD, AND PROGRAM

CROSS REFERENCE TO PRIOR APPLICATION

This application is a National Stage Patent Application of PCT International Patent Application No. PCT/JP2017/000206 (filed on Jan. 6, 2017) under 35 U.S.C. § 371, which claims priority to Japanese Patent Application No. 2016-009696 (filed on Jan. 21, 2016), which are all hereby incorporated by reference in their entirety.

TECHNICAL FIELD

The present technique relates to a recording adjustment device, a recording adjustment method, and a program, and more specifically, to a recording adjustment device, a recording adjustment method, and a program of which enables recording compensation for an optical disc for a high-linear density to be realized.

BACKGROUND ART

In recent years, a use application as a medium for data archive for preserving important data in the long term has attracted attention as a use application of an optical disc such as a Blu-ray (registered trademark) Disc (hereinafter referred to as a BD). The higher-linear density promotion is required for the optical disc for data archive in order to enable the more data to be preserved.

The recording of the data in the optical disc is carried out by forming a mark and a space in a recording layer. The intensity of a laser beam is modulated on the basis of a recording pattern, and the recording layer is irradiated with a recording pulse, thereby forming the mark.

On the other hand, the laser beam is applied to the recording layer, and a regenerative signal as a change in light quantity of return light generated from the optical characteristics such as a difference in reflectivity between the mark and the space is obtained, thereby reproducing the recorded data. Signal processing is executed for the regenerative signal, thereby reproducing the recorded data.

At the time of recording of the data, for reducing the error in the regenerative signal, the recording compensation for adjusting edge positions of a start edge and an end edge of the mark. The recording compensation is especially required in the case where an optical disc in which a mark length and a space length are much smaller than an optical spot size, that is, an optical disc for a high-linear density is used.

In the case where the length of the space is short, the heat when the mark is formed is not sufficiently reduced in the space portion, which exerts an influence on the temperature of the edge of the start edge in the rear-side mark. Contrary to this, the heat when the edge of the start edge in the rear-side mark is formed exerts an influence on the cooling of the heat at the edge of the end edge of the front-side mark. Such a thermal interference causes the position shift in the recorded mark. In the case where the optical disc in which the mark position is shifted is subjected to the reproduction, the regenerative signal is influenced, so that the data cannot be properly reproduced.

The recording compensation is processing for finely adjusting the pulse shape of the laser beam to compensate (shift) the edge portion of the mark which is fluctuated by the thermal interference to the proper position. In the BDXL (registered trademark) standards as the extended standards of the BD standards, an L-SEAT method is adopted as a method for estimation and adjustment of the edge shift. The L-SEAT method is disclosed in PTL 1.

CITATION LIST

Patent Literature

[PTL 1]
  JP 2011-23069A

SUMMARY

Technical Problem

The high-linear density promotion of the optical disc has been progressed, in the optical disc having the linear density (corresponding to 40 GB or more) which is 1.5 or more times as large as the BD, the estimation and the adjustment of the edge shift by using the L-SEAT method have been difficult to carry out. This results from that the regenerative signal becoming the source of the recording compensation contains many interference components between the codes, and thus the estimation of the position of the recorded mark, and the adjustment of the position of the mark to be recorded have become more difficult to carry out.

The present technique has been made in the light of such a situation, and enables the recording compensation for the optical disc for the high-linear density to be realized.

Solution to Problem

A recording adjustment device of an aspect of the present technique is provided with a storage portion, a filter processing portion, a calculation portion, a detection portion, a control portion, and a processing control portion. In this case, the storage portion serves to store a recording pattern of marks and spaces of data recorded in a recording medium. The filter processing portion serves to identify an impulse response of a system on the basis of a regenerative signal obtained by reproducing the data recorded in the recording medium, and the recording pattern stored in the storage portion. The calculation portion serves to calculate a difference in amplitude between an output from the filter processing portion after the impulse response is identified, and the regenerative signal every edge type. The detection portion serves to detect a slope of a step response in a vicinity of an edge position. The control portion serves to calculate a correction amount of the edge position for each edge type on the basis of the difference between the amplitudes and the slope of the step response, correct the edge position in response to the correction amount, causes data as recording target to be recorded in the recording medium, and cause the recording pattern of the marks and the spaces of the data as the recording target to be stored in the storage portion. In addition, the processing control portion serves to cause recording compensation processing including at least processing by the calculation portion and processing by the control portion of processing by the filter processing portion, the processing by the calculation portion, processing by the detection portion, and the processing by the control portion to be repetitively executed by changing the data becoming a target of reproduction, and data as the recording target to each other.

In the aspect of the present technique, the recording pattern of the marks and spaces of the data recorded in the recording medium is stored in the storage portion. The filter processing portion identifies the impulse response of the system on the basis of the regenerative signal obtained by reproducing the data recorded in the recording medium, and the recording pattern stored in the storage portion. In addition, the calculation portion calculates the difference in amplitude between the output from the filter processing portion after the identification of the impulse response, and the regenerative signal every edge type. The detection portion detects the slope of the step response in the vicinity of the edge position. The control portion calculates the correction amount of the edge position for each edge type on the basis of the difference between the amplitudes, and the slope of the step response. The edge position is corrected in response to the correction amount, the control portion records the data as the recording target in the recording medium, and the control portion stores the recording pattern of the marks and the spaces of the data as the recording target in the storage portion. In addition, the recording compensation processing including at least the processing by the calculation portion and the processing by the control portion of the processing by the filter processing portion, the processing by the calculation portion, the processing by the detection portion, and the processing by the control portion is repetitively executed by changing the data becoming the reproduction target, and the data as the recording target to each other.

Advantageous Effect of Invention

According to the present technique, the recording compensation for the optical disc for the high-linear density can be realized.

It should be noted that the effect described herein is not necessarily limited, and any of the effects described in the present disclosure may be offered.

BRIEF DESCRIPTION OF DRAWINGS

FIG. 16 is a diagram depicting an example of setting parameters.

Figure 1:
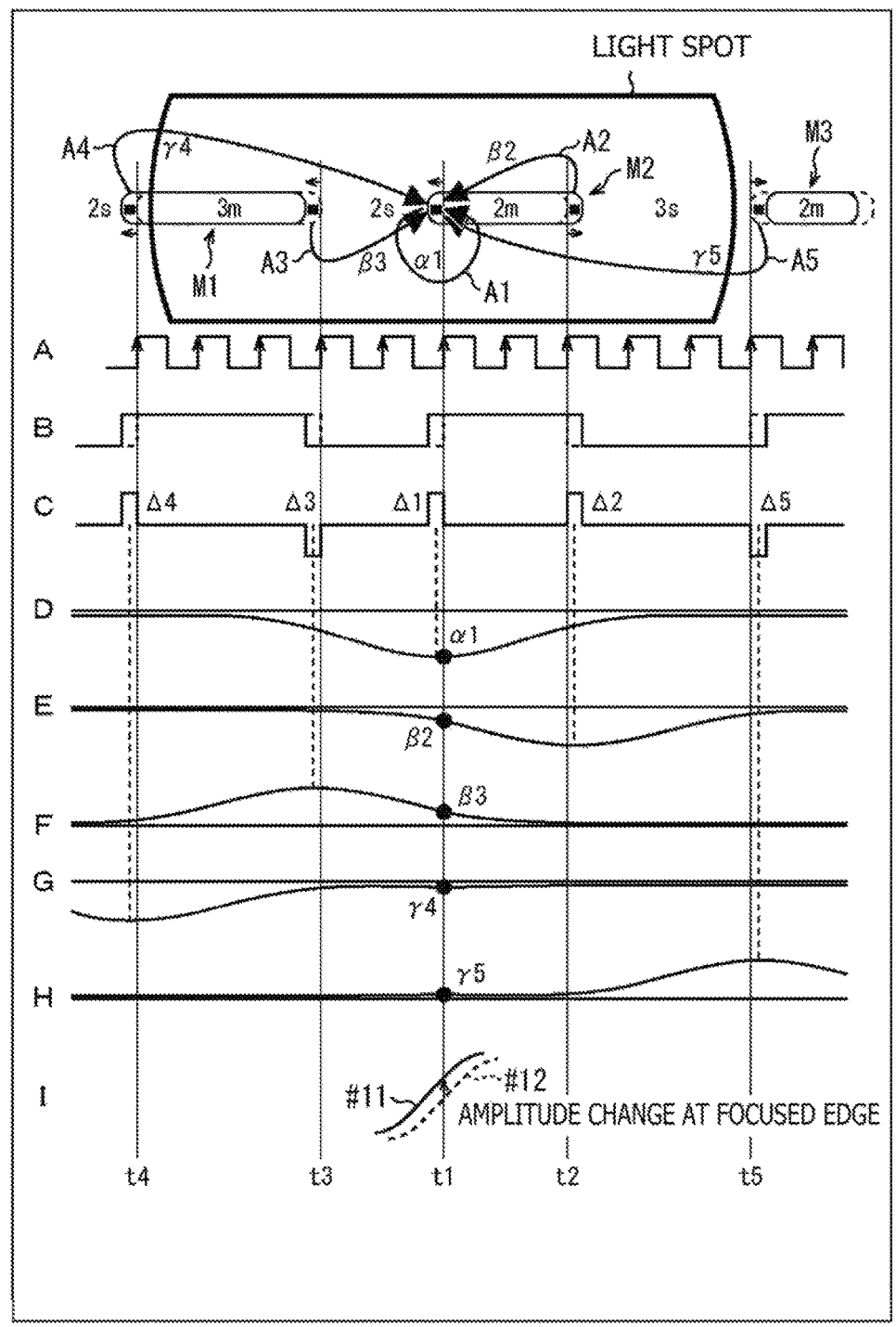
FIG. 1 is a timing chart depicting an influence of an intersymbol interference.

Hereinafter, a mode for carrying out the present technique will be described. A description will be given in accordance with the following order.

1. Premise
   1-1. With respect to terms and notations
   1-2. With respect to influence of intersymbol interference
   1-3. With respect to recording compensation
2. Configuration and Operation
   2-1. Overall configuration of recording adjustment device
   2-2. Example 1 of configuration of signal processing portion
   2-3. Example 2 of configuration of signal processing portion
   2-4. Recording adjustment processing of recording adjustment device
3. With Respect to Recording Strategy
4. Simulation Results
   4-1. Influence of correction coefficient α
   4-2. Change in amplitude difference average value
   4-3. Change in binary jitter value
   4-4. Effects
5. Modified Changes «1. Premise»

<1-1. With Respect to Terms and Notations>

Firstly, a description will be given with respect to terms and notations which will be used hereinafter.

An "amplitude difference" represents a difference between an amplitude of a regenerative signal followed by edge shift, and an amplitude of a regenerative signal not followed by the edge shift. The regenerative signal followed by the edge shift is a regenerative signal obtained by reproducing recording data containing the edge shift. On the other hand, the regenerative signal not followed by the edge shift is an expected waveform. The expected waveform is derived from an impulse response of a system including a Modulation Transfer Function (MTF).

An "LD" represents a Linear Density. For example, the notation of "LD50" represents that the linear density corresponds to 50 GB.

An "edge type" represents a kind of edge.

A "rising edge" is an edge at which a space (s) is changed over to a mark (m). The rising edge has the same meaning as that of a mark start edge.

A "falling edge" is an edge at which the mark (m) is changed over to the space (s). The falling edge has the same meaning as that of a mark end edge.

A "Least Mean Square (LMS) filter" is an adaptive filter which adapts in such a way that inputted data agrees with target data. A coefficient of the LMS filter when the inputted data have converged on the target data (when the identification has been completed) agrees with an impulse response of a transfer function.

A "round" is an executable unit of the recording compensation using the present technique.

A "WS" represents a Write strategy. The write strategy represents a light-emitting shape of a laser beam for finely recording a mark exhibiting the recording data.

A mark constituting the edge type is represented as "length+'m' (low case letter)," and a space constituting the edge type is represented as "length+'s' (low case letter)." For example, a mark of 2T is represented by '2m,' and a space of 4T is represented by '4s.' A mark of 5T after a space of 3T is represented as '3s5m.' It should be noted that 'T' represents a channel clock length.

In the case where the mark length and the space length each longer than a specific length are represented as being the regenerated, a mark is represented by "length+M' (upper case letter)," and a space is represented by "length+'S' (upper case letter)." For example, a mark (3m, 4m, 5m, . . . ) of 3T or more is represented by '3M', and a space (5s, 6s, 7s, . . . ) of 5T or more is expressed by '5S.'

An edge type sandwiched between the mark and the space is represented by placing "." (period) in an edge position. For example, an edge (rising edge of 3T mark) constituted by the 2T space and the 3T mark is represented by '2s.3m.' In addition, an edge (falling edge of 4T mark) constituted by a 4T mark after a space of 3T or more, and a 2T space is represented by '3S4m.2s.'

Hereinafter, a description will be given by assuming High-to-Low media. The High-to-Low media is an optical disc in which a reflectivity of a portion in which the mark is recorded is lower than a reflectivity of a space portion as an unrecorded portion. For this reason, pay attention to that the polarity of the impulse response becomes reverse to (minus direction) the polarity of in output signal.

<1-2. With Respect to Influence of Intersymbol Interference>

A description will now be given with respect to an influence of an intersymbol interference in an optical disc for a high-linear density.

(1) Influence of Intersymbol Interference

FIG. 1 is a timing chart depicting an influence of an intersymbol interference.

A description will be given with respect to the case where, as depicted in an upper stage of FIG. 1, three marks: a mark M1 as a 3T mark; a mark M2 as a 2T mark; and a mark M3 as a 2T mark are recorded. A 2T space is formed between the left-side mark M1 and a central mark M2, and a 3T space is formed between the mark M2 and a right-side mark M3.

A position of an edge indicated by a dotted line represents a position of a target edge (a position of an ideal edge). In addition, a position of an edge indicated by a solid line represents a position of an edge formed by the actual recording.

A rising edge and a falling edge of the mark M1 are formed so as to be shifted to the left side with respect to a target position. In addition, a rising edge of the mark M2 is formed so as to be shifted to the left side with respect to a target position, and a falling edge of the mark M2 is formed with being shifted to the right side with respect to a target position. A rising edge of the mark M3 is formed so as to be shifted to the right side with respect to a target position, and a falling edge of the mark M3 is formed so as to be shifted to the left side with respect to a target position. Hereinafter, the edge which is formed in the ideal position is suitably referred to as an ideal edge, and the edge which is actually formed is suitably referred to as a recording edge.

In this example, a part of the right side of the mark M1, and the mark M2 are contained in a spot of a laser beam surrounded by a thick frame. The rising edge of the mark M2 located at time t1 shall be a focused edge. It should be noted that in FIG. 1, for convenience, a shape of the spot of the laser beam is exhibited by a barrel-shaped thick frame obtained by shaving an upper side and a lower side of a circle. In addition, actually, the amplitude of the spot of the laser beam has a hem-shaped spreading as will be described later with reference to FIG. 2. Although the rising edge of the mark M1, and the rising/falling edge of the mark M3 is depicted outside the spot of the laser beam in FIG. 1, an influence of the edge shift of these edges shall be executed on the focused edge.

In the case where in such a way, a size of the spot of the laser beam is large with respect to the length of the mark/space, an influence in which an influence of the edge shift of the focused edge itself, and an influence of the edge shift of the peripheral edge are superposed on each other is generated as an intersymbol interference for the focused edge.

An arrow A1 represents the influence of the edge shift of the focused edge itself. An arrow A2 represents the influence of the edge shift of the falling edge of the mark M2 as an adjacent edge. An arrow A3 represents the influence of the edge shift of the falling edge of the mark M1 as an adjacent edge. An arrow A4 represents the influence of the edge shift of the rising edge of the mark M1 of an edge adjacent to the adjacent edge. In addition, an arrow A5 represents the influence of the edge shift of the rising edge of the mark M3 of an edge adjacent to the adjacent edge.

A of FIG. 1 represents a channel clock signal, and B of FIG. 1 represents a signal obtained by binarizing the regenerative signal. In the binary signal of B of FIG. 1, a dotted line represents a state of an ideal (target) signal, and a solid line represents a state of an actually recorded signal. The state of the ideal signal is observed in the case where the edge is formed in the ideal position.

C of FIG. 1 represents a difference between the recording edge and the ideal edge. The difference between the recording edge and the ideal edge becomes an edge shift component.

As depicted in C of FIG. 1, an edge shift component of the rising edge of the mark M2 as the focused edge is represented by $\Delta 1$, and an edge shift component of the falling edge of the mark M2 is represented by $\Delta 2$. In addition, an edge shift component of the falling edge of the mark M1 is represented by $\Delta 3$, and an edge shift component of the rising edge of the mark M1 is represented by $\Delta 4$. An edge shift component of the rising edge of the mark M3 is represented by $\Delta 5$.

D of FIG. 1 to H of FIG. 1 represent the impulse responses when the edge shift components $\Delta 1$ to $\Delta 5$ are inputted, respectively. As depicted in D of FIG. 1 to H of FIG. 1, in the case where the rising edge is shifted to the left side, the impulse response in the minus direction is outputted, while in the case where the rising edge is shifted to the right side, the impulse response in the plus direction is outputted. In addition, in the case where the falling edge is shifted to the left side, the impulse response in the plus direction is outputted, while in the case where the falling edge is shifted to the right side, the impulse response in the minus direction is outputted.

The influence in which the influence of the edge shift of the focused edge itself exerted on the focused edge, and the influence of the edge shift of the peripheral edge are superposed on each other can be expressed by a linear combination. The amplitude change (amplitude difference) of the impulse response by these edge shifts can also be expressed by the linear combinations (convolutions) of the impulse responses.

That is to say, if the amplitudes at the time t1 of the impulse responses when the edge shift components Δ1 to Δ5 are respectively inputted are assigned α1, β2, β3, γ4, and γ5, respectively, then, the amplitude difference at the focused edge is expressed by following Expression (1), α1, β2, β3, γ4, and γ5 are the influences at the focused edges of the edge shifts indicated by the arrows A1 to A5.

[Expression 1]

$$\text{Amplitude difference at focused edge} = \alpha1 + \beta2 + \beta3 + \gamma4 + \gamma5 \qquad (1)$$

Variables constituting the amplitude difference expressed by Expression (1) differ depending on a pattern of marks/spaces with the focused edge as the reference. The amplitude difference at the focused edge is expressed as a difference between a curved line #11 and a curved line #12 of I of FIG. 1.

(2) Influence 2 of Intersymbol Interference

Figure 2:
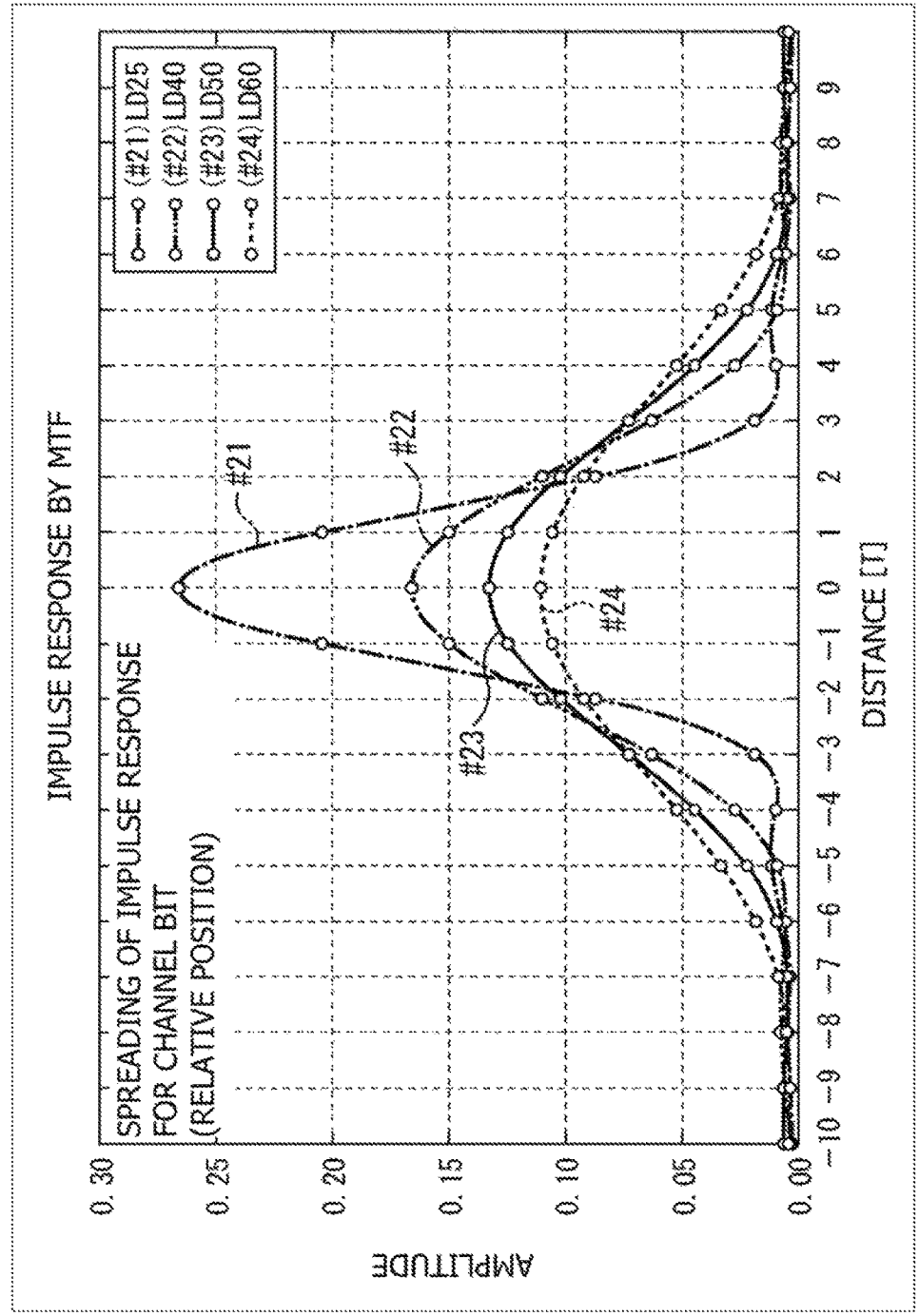
FIG. 2 is a graphical representation depicting spreading of an impulse response responding to a linear density.

FIG. 2 is a graphical representation depicting spreading of the impulse response responding to the linear density.

An axis of abscissa represents a channel bit interval, and an axis of ordinate represents a value of the impulse response. Curved lines #21 to #24 represent impulse responses in the optical disc of the linear densities 25 GB (LD25), 40 GB (LD40), 50 GB (LD50), and 60 GB (LD60), respectively.

As the linear density becomes higher, the impulse response of HTF spreads in hem thereof. This represents that as the linear density is higher, the amplitude of the focused edge is largely influenced by the peripheral edge.

Figure 3:
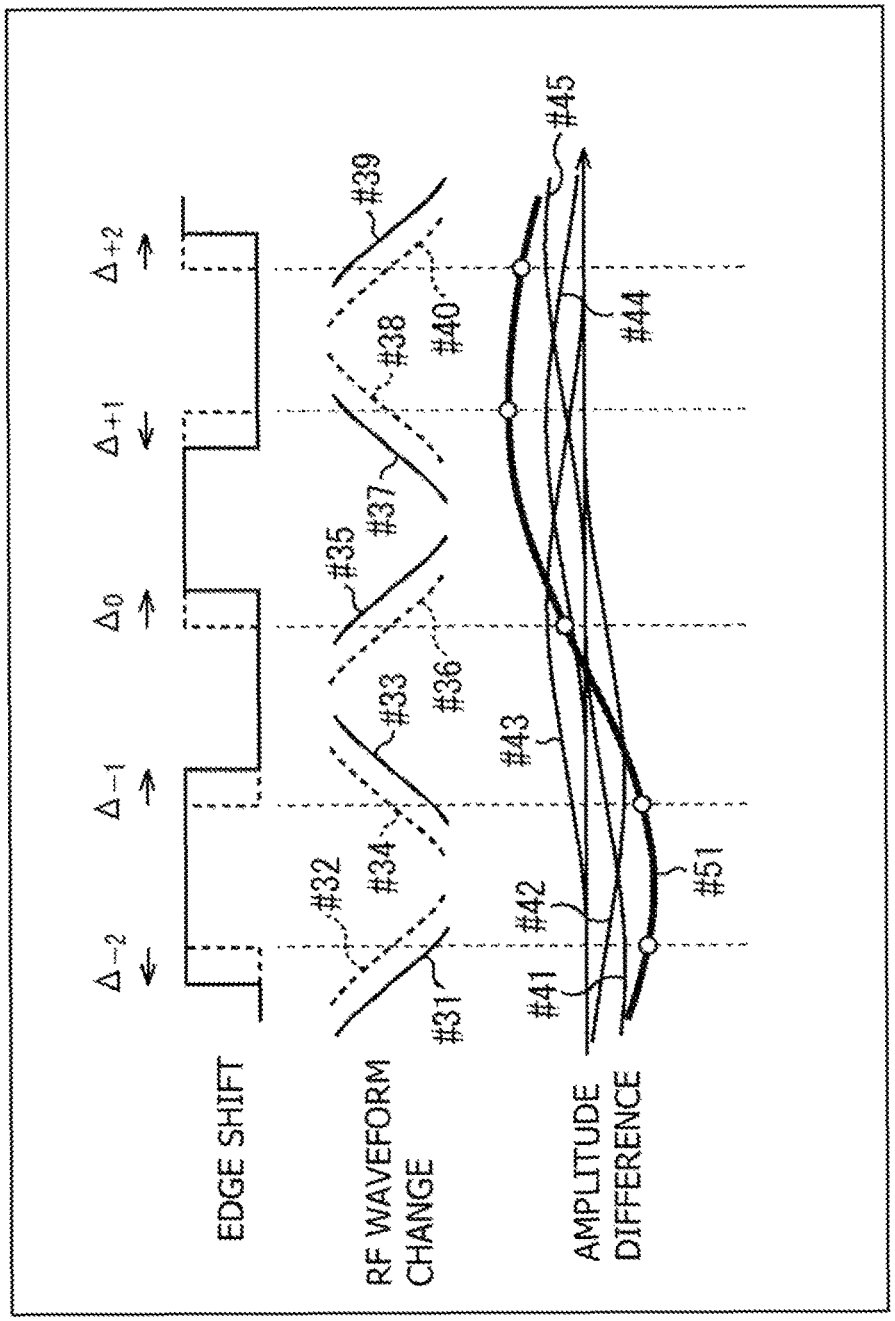
FIG. 3 is a graphical representation depicting an amplitude difference observed in the case where there is edge shift.

FIG. 3 is a graphical representation depicting the amplitude difference observed in the case where there is the edge shift.

A signal depicted in an upper stage of FIG. 3 corresponds to the binary signal described with reference to FIG. 1. The binary signal in the upper stage of FIG. 3 represents that a rising edge of a central mark is formed so as to be shifted to the right side with respect to the target position, and a falling edge thereof is formed so as to be shifted to the left side with respect to the target position. The edge shifts of other edges are also similarly each represented by the binary signal in the upper stage of FIG. 3.

In the case where the mark containing such an edge shift is reproduced, the influence of the edge shifts appears in a waveform of the regenerative signal. For example, a curved line #31 expressed by a solid line represents the regenerative signal of the recording edge of the rising of the left-side mark, and a curved line #32 represents the regenerative signal of the ideal edge of the rising of the left-side mark.

A difference in amplitude between the curved line #31 and the curved line #32 becomes a component of the influence exerted on the focused edge by the rising edge of the left-side mark. The amplitude difference is expressed by a difference between the amplitude of the regenerative signal, and the amplitude of the regenerative signal in the ideal state having no edge shift. This also applies to other edges.

Waveforms of a lower stage of FIG. 3 represent the amplitude differences which the edge shifts of the edges give the focused edge. As described with reference to FIG. 1, the amplitude difference is expressed by the impulse response with the edge shift component as the input.

A curved line #41 represents the amplitude difference resulting from the edge shift of the rising edge of the left-side mark. A curved line #42 represents the amplitude difference resulting from the edge shift of the falling edge of the left-side mark.

Likewise, a curved line #43 represents the amplitude difference resulting from the edge shift of the rising edge of the central mask, that is, the edge shift of the focused edge itself. A curved line #44 represents the amplitude difference resulting from the edge shift of the falling edge of the central mask. A curved line #45 represents the amplitude difference resulting from the edge shift of the rising edge of the right-side mask.

A curved line #51 indicated by a heavy line represents the amplitude difference which is actually observed. The actually observed amplitude difference represents the intersymbol interference given to the focused edge, and corresponds to the amplitude difference obtained by adding the amplitude differences represented by the curved lines #41 to #45.

From the foregoing, the state in which the edge is recorded in the proper position shall be realized when there is a state in which the amplitude difference superposed on the intersymbol interference is 0.

<1-3. With Respect to Recording Compensation>

(1) Outline

A description will now be given with respect to an outline of recording compensation carried out in a recording adjustment device according to an embodiment of the present technique. Hereinafter, a method for the recording compensation concerned is suitably referred to as the present recording compensation method.

The present recording compensation method is such that an amount of edge shift is minimized by multiple times of recording compensation with an edge shift presumption amount as a source.

In the present recording compensation method, the slope of the step response is obtained from the impulse response of the system including the MTF, and a relationship between the edge shift amount, and the amplitude difference resulting from the edge shift is presumed by using the slope of the step response. The edge shift amount corresponding to the amplitude difference can be specified on the basis of a value representing the presumed relationship.

The amplitude difference of the focused edge is considered to result from only the edge shift of the focused edge itself, and thus the edge shift amount specified from the amplitude difference of the focused edge is calculated as the edge shift presumption amount. Here, not only the component due to the edge shift of the focused edge, but also the component due to the edge shift of the peripheral edge are actually contained in the amplitude difference obtained from the regenerative signal or the like. The edge shift presumption amount is an edge shift amount which is obtained without taking the partial component actually contained in the amplitude difference obtained from the regenerative signal or the like into consideration.

In addition, the edge shift presumption amount is multiplied by a correction coefficient α, and a value obtained by sign-inverting the multiplication result is used as an edge shift correction amount, thereby adjusting the edge position. In the present recording compensation method, such adjustment of the edge position is repetitively carried out.

In such a way, the present recording compensation method is a repetition type recording compensation method using the slope and amplitude of the step response, and the correction coefficient. The present recording compensation method is denominated as a step slope recording adjustment method (SSR method).

(2) Slope of Step Response

Here, a description will be given with respect to the physical utility of the slope of the step response.

Figure 4:
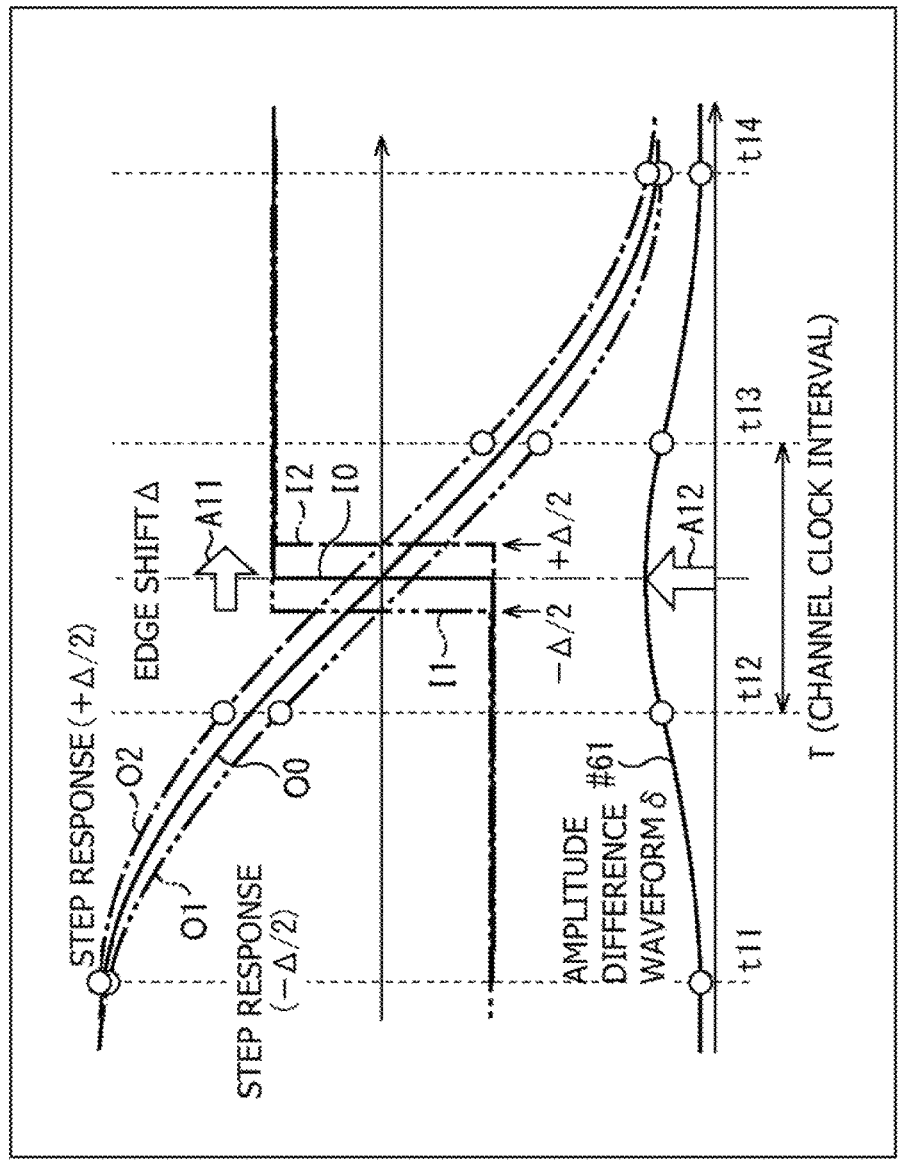
FIG. 4 is a graphical representation depicting a relationship between a step response and an amplitude difference waveform.

FIG. 4 is a graphical representation depicting a relationship between the step response and an amplitude difference waveform.

Let us consider a step input I0 representing a rising edge of a certain mark.

A step input in which the step input I0 is shifted to the left side by −Δ/2 is assigned I1, and a step input in which the step input I0 is shifted to the right side by +Δ/2 is assigned I2. Step responses to the respective step inputs are expressed as O1 and O2.

Now, in the case where the edge shift (arrow A11) is made with the step input I0 as a center, the amplitude difference waveform is expressed by following Expression.

[Expression 2]

$$\text{Amplitude difference waveform } \delta = \text{step response } (O2) - \text{step response } (O1) \quad (2)$$

Here, the edge shift amount, as depicted in following Expression (3), is equal to Δ.

[Expression 3]

$$(+\Delta/2) - (-\Delta/2) = \Delta \quad (3)$$

In the case where the edge shift amount Δ is brought close to approach 0, the waveform obtained by dividing the amplitude difference waveform δ by the edge shift amount Δ becomes equal to polarity reversion of a derivative function expressing a slope waveform of the step response. This can be expressed by following Expression (4).

[Expression 4]

$$\lim_{\Delta \to 0} \frac{\delta}{\Delta} = \text{polarity reversion waveform of slope of step response } (O0) \quad (4)$$

A right member at this time is named as a step-slope waveform. A concrete waveform becomes a waveform expressed by a curved line #61 in the lower stage of FIG. 4.

This means that by using the slope of the step response, it is possible to obtain the edge shift amount Δ corresponding to the value δ of the amplitude difference in the focused edge.

Figure 5:
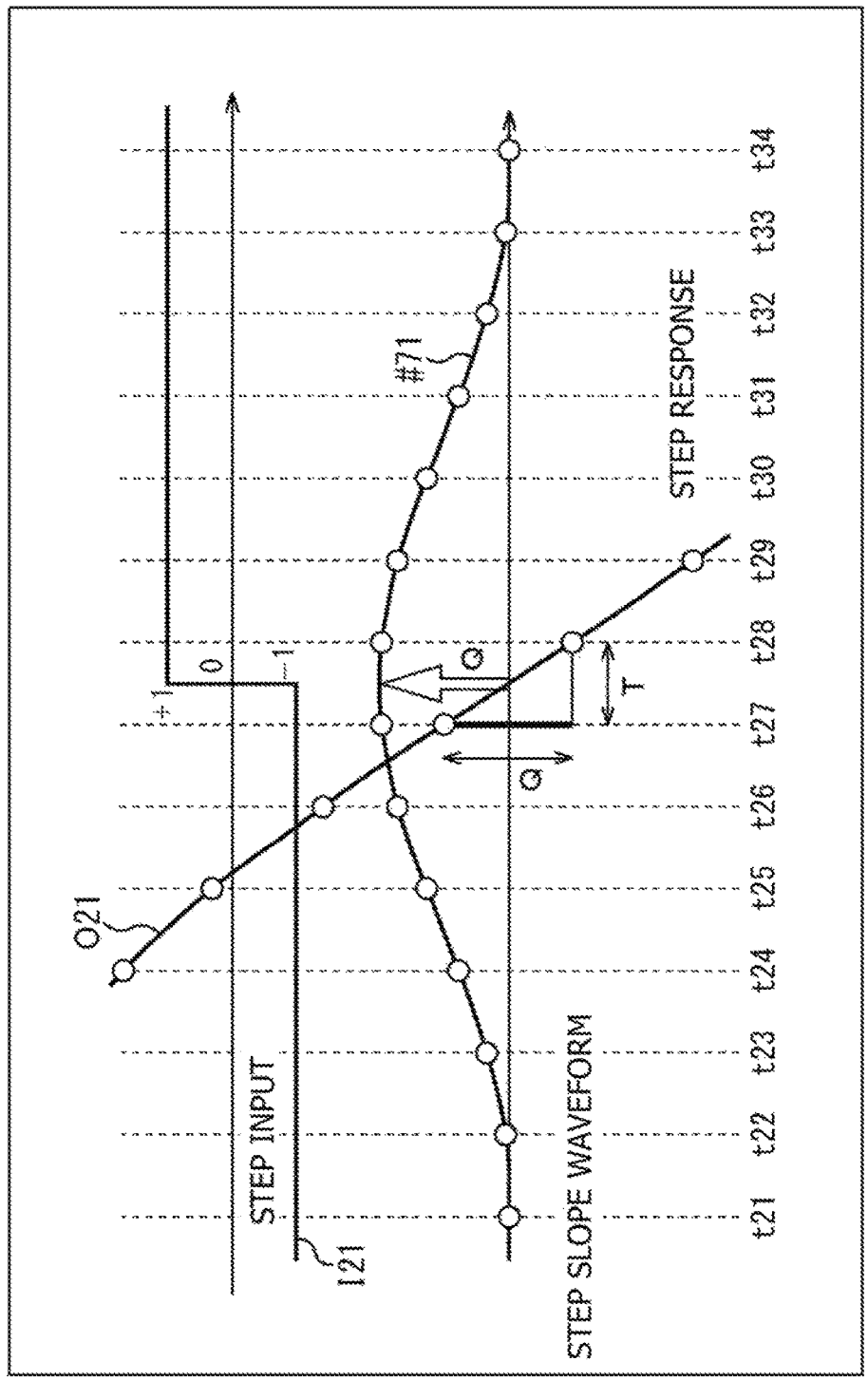
FIG. 5 is a graphical representation depicting a relationship between the step response and a Q value of step slope.

FIG. 5 is a graphical representation depicting a relationship between the step response, and a Q value of the step slope.

A curved line O21 represents the step response corresponding to a step input I21. In the case where it is assumed that −1 and 1 continue in an endless fashion forward and backward, across an edge of a certain mark, a step response as depicted by a curved line O21 is obtained.

In the case where the slopes in the positions of the step response expressed by the curved line O21 are plotted, and the plots are connected to one another, the slope of the step response is expressed by a curved line #71.

If a Q value is set on behalf of the height of the step slope waveform, that is, the slope of the step waveform in the vicinity of the edge position, then, the Q value has the following features.

The feature of the edge position is expressed the best.

The influence of the edge of the circumference is smallest.

The Q value is equal to a difference between two points (interval T) of the step response.

In the vicinity of the edge position, the step response waveform can be approximated by a straight line. The Q value can be expressed as the difference of the step response between two points (the positions shifted to each other by a distance corresponding to one clock) just before and just after the edge position by following Expression (5).

[Expression 5]

$$Q \text{ value} = \text{step response amplitude right before edge} - \text{step response amplitude right after edge} \quad (5)$$

When the amplitude difference in the vicinity of the edge position is δ, from the definition of the step slope, the edge shift amount Δ is expressed by following Expression.

[Expression 6]

$$\Delta = \delta/Q \quad (6)$$

In such a way, the Q value specified from the slope of the step response represents a relationship between the edge shift amount, and the amplitude difference resulting from the edge shift.

(3) Method of Calculating Q Value

Here, a description will be given with respect to a method of calculating the Q value.

(3-1) First Calculation Method

A first calculation method is a method in which the amplitude difference in the vicinity of the edge position constituted by a long mark/a long space of the regenerative signal is set as the Q value.

The step response is a waveform obtained in the case where an infinitely long mark and an infinitely long space are reproduced. However, with respect to the vicinity of the edge position, the step response waveform can be approximated by using a regenerative signal obtained from a sufficiently long mark and a sufficiently long space.

Figure 6:
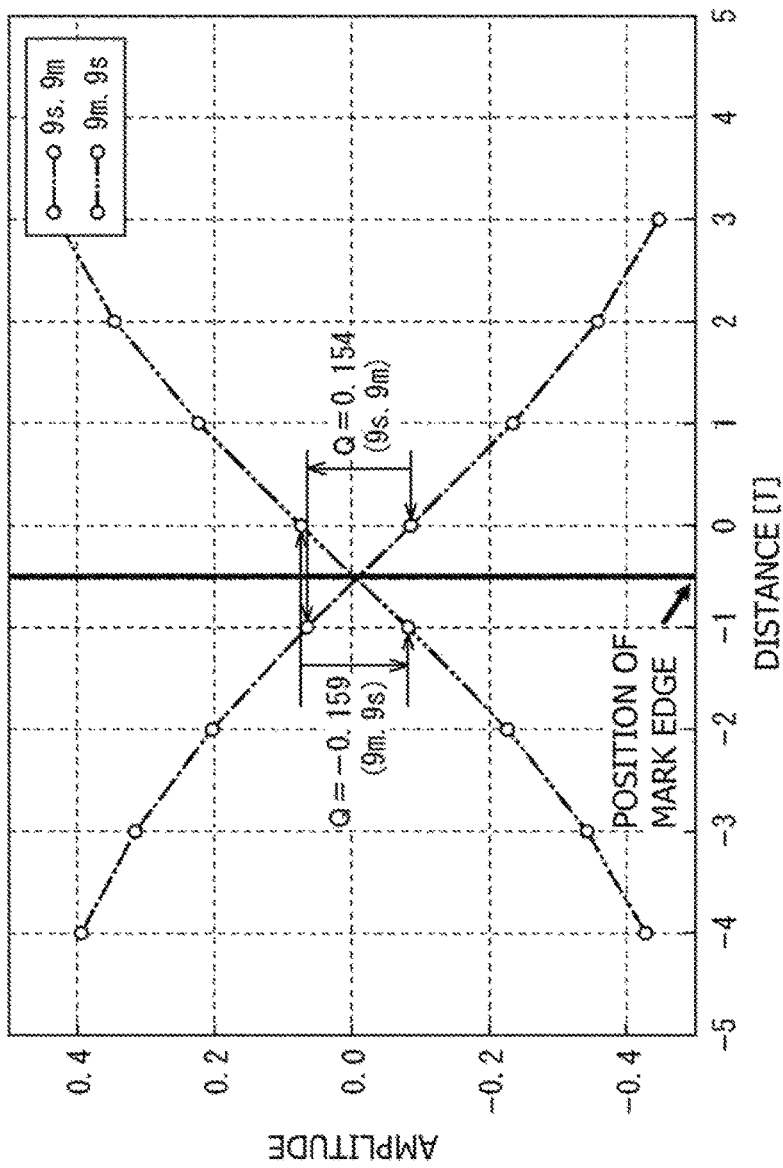
FIG. 6 is a graphical representation depicting a relationship between a regenerative signal of a long mark/a long space, and the Q value.

FIG. 6 depicts a situation of a waveform in the vicinity of the mark edge corresponding to the long number/the long space in the actual representative signal. Thus, FIG. 6 depicts the regenerative signal in the vicinity of the mark edge in the case where there is two continuous 9T.

An axis of ordinate represents the amplitude, and an axis of abscissa represents a distance in units of a channel clock length. A regenerative signal indicated by a long dashed dotted line is a regenerative signal in the case where a rising edge constituted by a 9T space-a 9T mark is set as the focused edge. In addition, a regenerative signal indicated by a chain double-dashed line is a regenerative signal in the case where a falling edge constituted by a 9T mark-a 9T space is set as the focused edge.

It is understood from FIG. 6 that the linearity in the vicinity of the edge position (inflection point) constituted by the long mark and the long space is satisfactory, and the Q value can be derived from the slope. Specifically, the Q value becomes a difference between the amplitudes in two points which are at a distance of 1T from each other across the edge position.

In this example, the Q value by the rising edge is 0.154, and the Q value by the falling edge is −0.159. An average value of the magnitudes of the Q values is approximately 0.157.

In the case where the Q value is desired to be obtained by using the first calculation method, in the recording compensation device, for example, the calculation of the Q value can be carried out by using the regenerative signal of the long mark/the long space such as 9T mark/9t space.

(3-2) Second Calculation Method

A second calculation method is a method of obtaining the Q value from the identified impulse response of the system.

Following Expression (7) is Expression for calculating the Q value. Here, h(0) represents a center tap coefficient of the pulse response identified by an LMS filter.

[Expression 7]

$$Q = -2h(0) \qquad (7)$$

Expression (7) is obtained as follows. That is to say, as depicted in following Expression (8-1), an output y(n) of a certain system can be expressed by a convolution arithmetic operation of an impulse response h(n), and an input x(n) of this system. If the input x(n) is a step input, and is −1 in an area of n<0, and +1 in an area of n≥0, then, Expression (8-1) can be expressed as Expression (8-2). It should be noted that h(n) fulfills the conditions of Expression (9).

[Expression 8]

$$y(n) = \sum_{k=-\infty}^{\infty} x(k)h(n-k) \qquad (8\text{-}1)$$

$$= -\sum_{k=-\infty}^{-1} h(n-k) + \sum_{k=0}^{\infty} h(n-k) \qquad (8\text{-}2)$$

[Expression 9]

$$\lim_{n \to \pm\infty} h(n) = 0 \qquad (9)$$

Now, attention is paid to that the impulse response is equal to a difference between the step responses which are shifted back and forth in a time axis direction. Then, let us consider a difference between a step response y(n), and a step response y(n−1) obtained by shifting the step response y(n) by 1T. A difference y(−1)−y(0) between the step responses in the case of n=0 becomes −2h(0) as expressed in following Expression (10). From this fact, it is understood that the Q value is calculated from Expression (7).

[Expression 10]

$$y(-1) - y(0) = -2h(0) \qquad (10)$$

Figure 7:
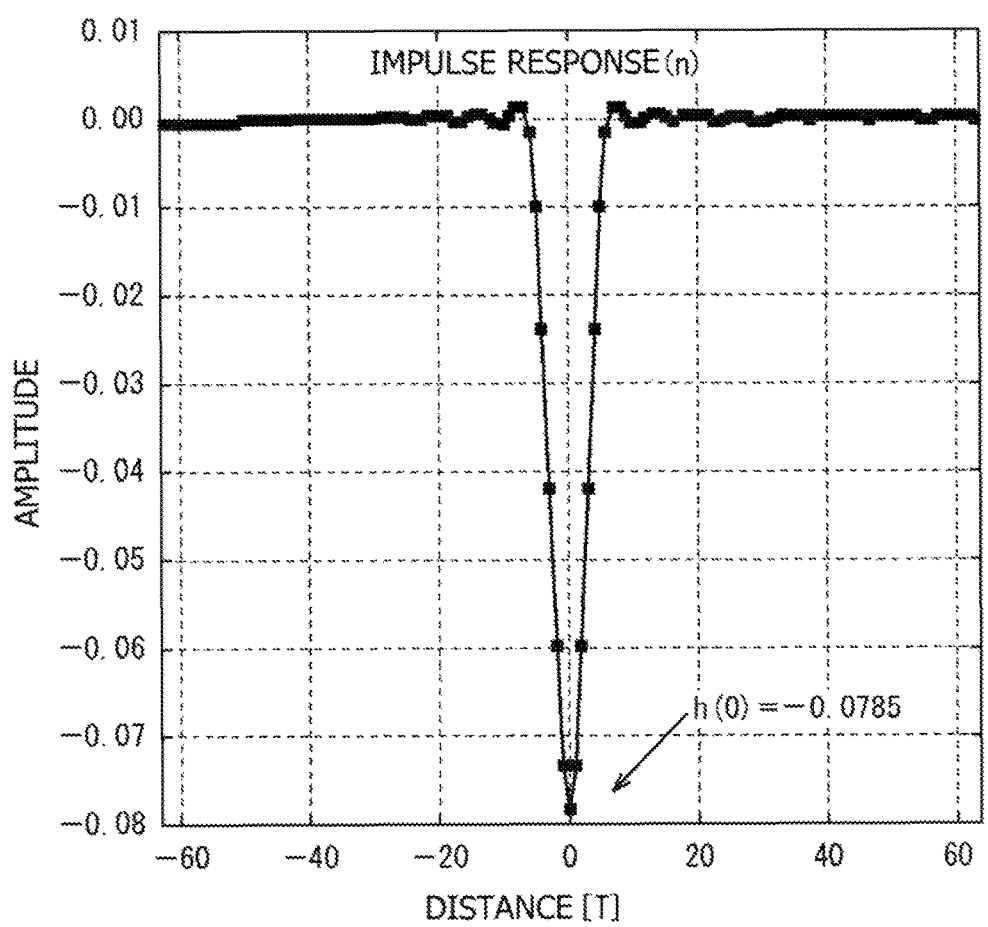
FIG. 7 is a graphical representation depicting an example of an impulse response identified by an LMS filter.

FIG. 7 is a graphical representation depicting an example of the impulse response identified by the LMS filter using the actual regenerative signal. As depicted in the figure, when a value of the center tap of the LMS filter is set as h(0), the following relationship is obtained:

$$h(0) = -0.0785$$

From Expression (7), the Q value is calculated as 0.157. It is understood that this value is substantially equal to the value obtained from the first calculation method.

As will be described later, in the case where the Q value is desired to be obtained from the second calculation method, in the recording adjustment device, the impulse response of the system is identified by the LMS filter, and the calculation of the Q value is carried out by using the filter coefficient of the LMS filter after the identification. The impulse response corresponds to a filter coefficient of an adaptive filter such as the LMS filter.

Figure 8:
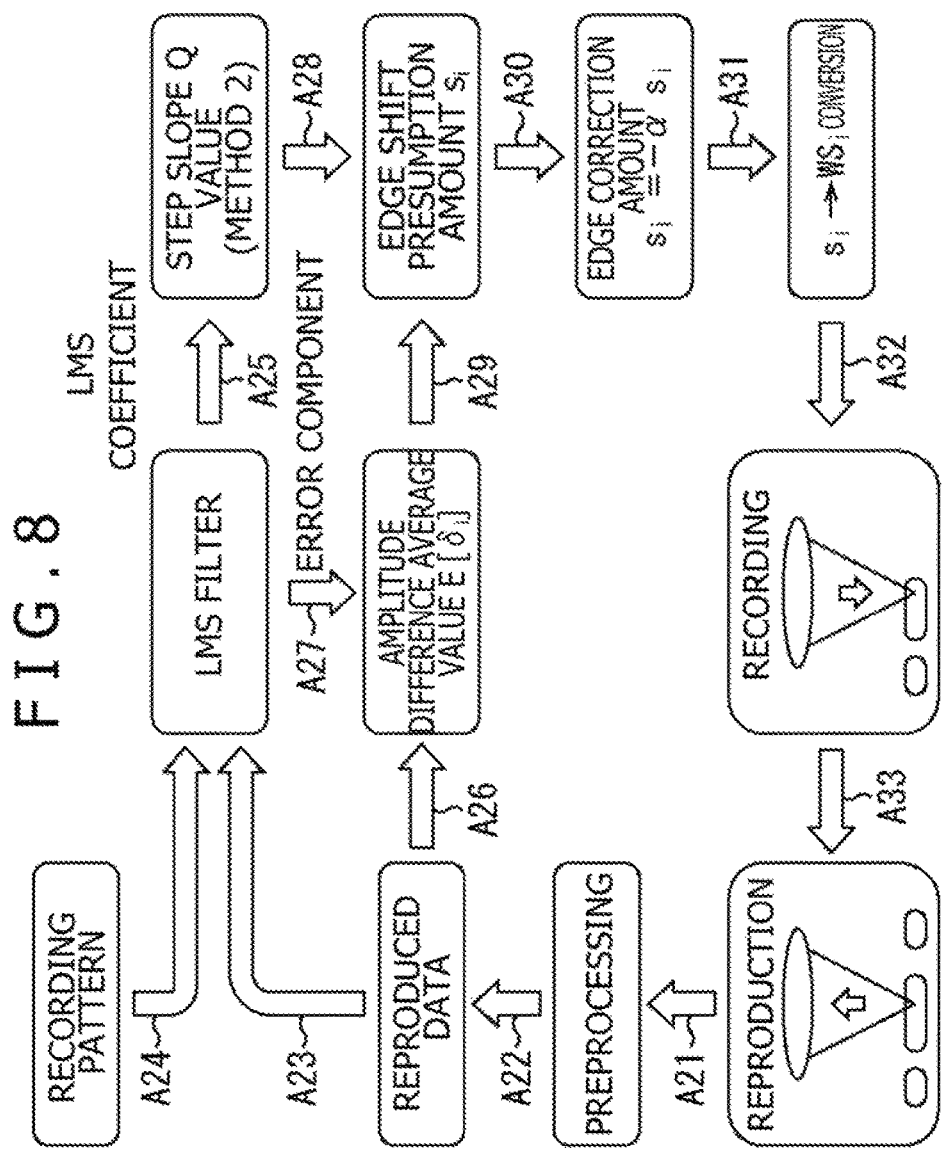
FIG. 8 is a flow chart depicting a flow of processing by the present recording compensation method.

(4) With Respect to Flow of Processing by the Present Recording Compensation Method FIG. 8 is a view depicting a flow of processing by the present recording compensation method.

As described in the lower left of FIG. 8, the data of a predetermined unit recorded in the optical disc is reproduced to produce a regenerative signal. For example, the data recorded at the last minute is reproduced. Hereinafter, although a description will be given with respect to the case where the data recorded at the last minute is reproduced as an example, the data becoming a target of the reproduction is by no means limited to the data recorded at the last minute. The data to be reproduced, for example, is the data recorded in a user data area of an optical disc. Various kinds of data inputted to the recording adjustment device are recorded in the user data area.

As depicted in the front of an arrow A21, preprocessing such as A/D conversion is executed for the regenerative signal. For the preprocessing, processing or the like for applying an Equalizer (EQ) or a Partial-Response (PR) filter may be executed as the preprocessing. By executing the preprocessing, as depicted in the front of an arrow A22, reproduced data is obtained.

The reproduced data, as indicated by an arrow A23, is supplied to the LMS filter. As indicated by an arrow A24, a recording pattern is also supplied to the LMS filter. The recording pattern to be supplied to the LMS filter is a pattern of marks/spaces of data (the same data as that reproduced) recorded at the last minute, and has preserved in a memory at the time of the recording of the reproduced data.

In the LMS filter, the impulse response of the system including the MTF is identified on the basis of the recorded pattern and the reproduced pattern. Until the impulse response of the system is identified, the reproduction of the data is repetitively carried out. An output from the LMS filter after the identification corresponds to the amplitude difference δ as the error component. An output from the FIR filter within the LMS filter corresponds to the expected waveform.

The filter coefficient of the LMS filter after the identification, as described above, corresponds to the impulse response. The filter coefficient of the LMS filter, as depicted in the front of an arrow A25, is used for the calculation of the Q value. That is to say, the processing depicted in FIG. 8 is processing in the case where the Q value is obtained by using the second calculation method described above. In the case where the Q value is obtained by using the first calculation method, the calculation using the long mark/the long space contained in the reproduced data is carried out.

On the other hand, as depicted in the fronts of arrows A26 and A27, the amplitude differences δ represented by the error components outputted from the LMS filter after the identification are classified every edge type to be averaged, thereby obtaining an average value $E[\delta_i]$ of the amplitude differences for each edge type.

As indicated in the fronts of arrows A28 and A29, the edge shift presumption amount $s_i$ is obtained on the basis of the average value $E[\delta_i]$ of the amplitude differences, and the Q value by following Expression (11) As described above, the Q value is the value representing a relationship between the edge shift amount, and the amplitude difference due to the edge shift. Therefore, the edge shift amount corresponding to the Q value can be obtained on the basis of the detected amplitude differences. The edge shift amount obtained by using the Q value is specified as the edge shift amount $s_i$.

[Expression 11]

$$s_i = E[\delta_i]/Q \qquad (11)$$

As indicated in the front of an arrow A30, the edge shift presumption amount $s_i$ is multiplied by the correction coefficient α, and the sign invrersion is carried out, thereby obtaining an edge shift correction amount $s_i'$. The edge shift correction amount $s_i'$ is expressed by following Expression (12).

[Expression 12]

$$s_i' = -\alpha \cdot s_i \qquad (12)$$

As indicated in the front of an arrow A31, the edge shift correction amount $s_i'$ is converted into a recording strategy $WS_i$.

As indicated in the front of an arrow A32, data is recorded in the optical disc on the basis of the recording strategy $WS_i$. The data which is recorded herein, for example, is new data following the data which is recorded at the last minute and which constitutes the data inputted as the data for recording to the recording adjustment device. The data representing a pattern of the marks/spaces of the new data recorded in the optical disc is preserved as a recording pattern in the memory.

As indicated in the front of an arrow A33, the data which is recorded at the last minute is reproduced, and in and after the reproduction, the similar processing is repetitively executed. A series of the processing until the next data becoming the recording target is recorded in the optical disc after the data recorded in the optical disc is reproduced becomes processing for one record of the present recording compensation method.

Incidentally, of the processing for one round, the identification of the impulse response and the calculation of the Q value may be carried out every processing for one round, or may be carried out only in the processing for the first time round, and may be omitted in the processing for the rounds in and after the second time round. In the case where the identification of the impulse response and the calculation of the Q value are omitted, in the LMS filter, the filter coefficient obtained in the processing for the first time round is fixedly used.

In such a way, in the present recording compensation method, at the time of the recording of the predetermined data constituting the data inputted as the data for the recording to the recording adjustment device, the recording strategy is updated on the basis of the reproduced data of the data recorded at the last minute, and the recording pattern, and is used for the recording of the data.

Specifically, let us consider the case where data D1, data D2, and data D3 are recorded in order. Firstly, for example, the data D1 is recorded by using the default recording strategy. At this time, the recording pattern representing a pattern of marks/spaces of the data D1 is preserved in the memory.

At the time of the recording of the data D2, the impulse response of the system is identified by using the reproduced data obtained by reproducing the data D1 recorded at the last minute, and the recording pattern preserved in the memory. In addition, the edge shift presumption amount, the edge shift correction amount, and the like are calculated, thereby updating the recording strategy. The data D2 becoming the target of the recording is recorded in the optical disc by using the recording strategy after the update. At this time, the recording pattern representing a pattern of marks/spaces of the data D2 is preserved in the memory.

At the time of the recording of the data D3, the impulse response of the system is suitably identified by using the reproduced data obtained by reproducing the data D2 recorded at the last minute, and the recording pattern preserved in the memory. In addition, the edge shift presumption amount, the edge shift correction amount, and the like are calculated, thereby updating the recording strategy. The data D3 becoming the target of the recording is recorded in the optical disc by using the recording strategy after the update. At this time, the recording pattern representing the pattern of the marks/spaces of the data D3 is preserved in the memory.

In the case where the optical disc is a write once type recording medium, the data D1, the data D2, and the data D3, for example, are recorded in continuous areas of the user data area. If a dedicated area for recording adjustment is provided, then, the data D1, the data D2, and the data D3 may be recorded in the dedicated area.

The series of processing of the recording adjustment device as described above will be described later with reference to a flow chart.

(5) Way to Decide Correction Coefficient α

Here, a description will be given with respect to a way to decide the correction coefficient α used to calculate the edge shift correction amount.

(5-1) First Way to Decide

A first way to decide is a method in which the correction coefficient α is made a fixed value, and is set as a value smaller than 1.0, for example, a predetermined value within the range of 0.3 to 0.8. In this case, the correction coefficient α shall be previously set as the fixed value in the recording adjustment device.

(5-2) Second Way to Decide

A second way to decide is a method in which the correction efficient α is changed in response to the round. For example, for several times of rounds after the start of the recording, the large correction coefficient α is used, and in and after several times of rounds, whenever the round proceeds, the smaller correction coefficient α is used.

(5-3) Third Way to Decide

Figure 9:
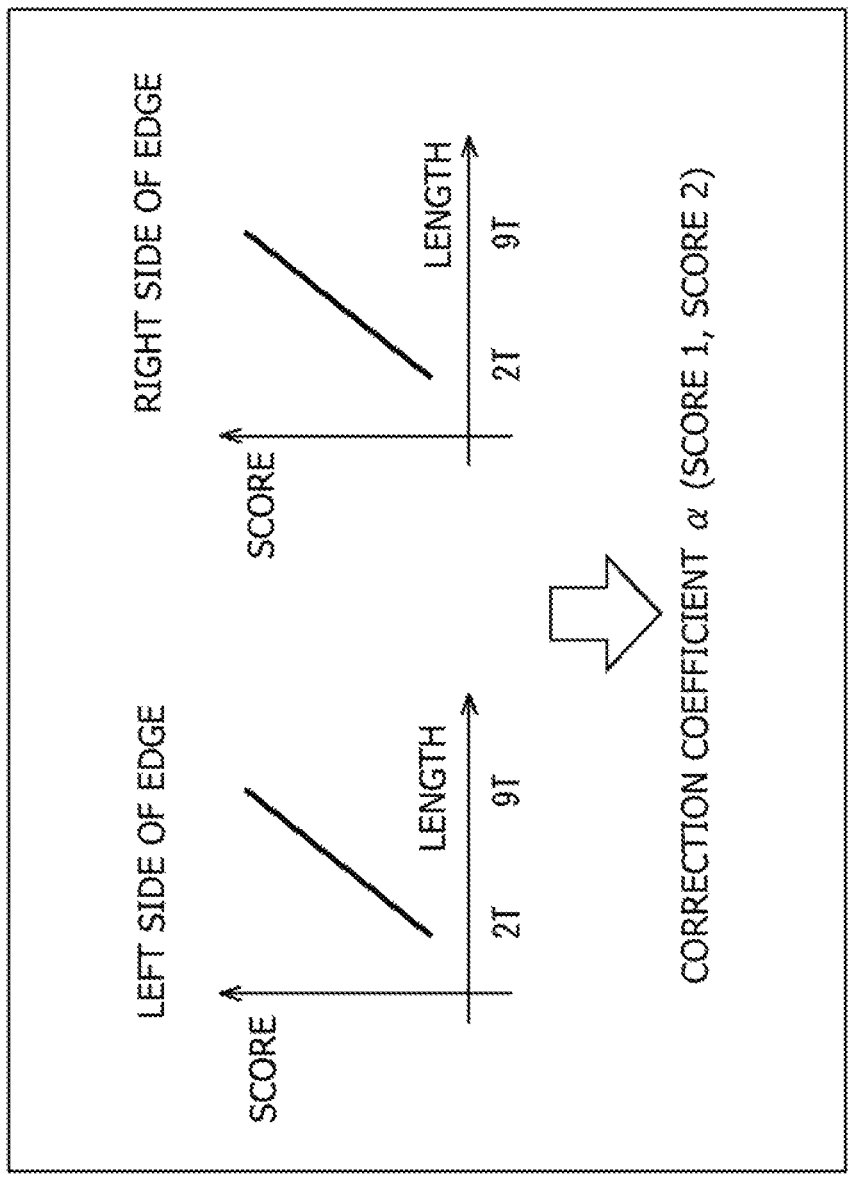
FIG. 9 is a diagram depicting an example of a way to decide a correction coefficient.

A third way to decide is a method in which the correction coefficient α is changed every edge type. In this case, as depicted in FIG. 9, a score (weight) is decided on the basis of the length of the marks/spaces in both ends of the edge, and thus the correction coefficient α responding to the score can be used.

As the marks/spaces constituting the edge is longer, the degree of certainty of the values of the edge shift presumption amount, and the like obtained on the basis of the reproduced data or the like becomes high. For example, as the mark/space constituting the edge is longer, the high score is obtained, and the larger correction coefficient α is used. The larger the correction coefficient α, the larger the edge shift correction amount.

(5-4) Fourth Way to Decide

When the small correction coefficient α is used, the edge shift correction amount becomes smaller than the adjustment resolution of the recording strategy, and thus the sufficient effect is not obtained in some cases. At this time, after once the correction coefficient α is made large and the recording adjustment is carried out, the small correction coefficient α may be set again, and the recording adjustment may be carried out.

(5-5) Fifth Way to Decide

A fifth way to decide is a method in which the correction direction is decided by the sign of the edge shift presumption amount, and the small correction amount is used as the edge shift correction amount. In this case, the correction coefficient α is not used in the calculation of the edge shift correction amount. For example, an amount of a minimum unit which is adjustable by the recording strategy is used as the edge shift correction amount.

(5-6) Sixth Way to Decide

The methods described above can also be partially combined with one another.

(5-7) Seventh Way to Decide

In the methods described above, the product of 1/Q and the correction coefficient α can be set as one parameter, and the correction coefficient α can also be decided by reflecting this parameter.

«2. Configuration and Operation»

<2-1. Overall Configuration of Recording Adjustment Device>

Figure 10:
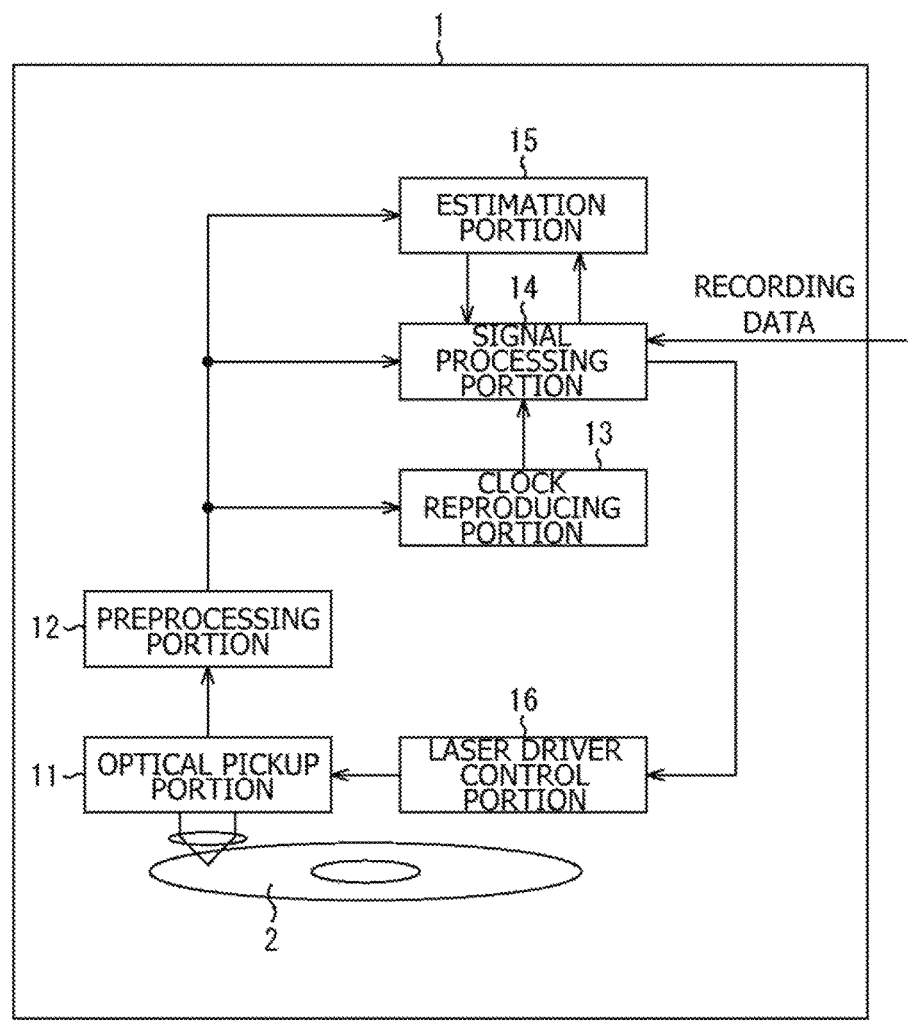
FIG. 10 is a block diagram depicting an example of a configuration of a recording adjustment device according to an embodiment of the resent technique.

FIG. 10 is a block diagram depicting an example of a configuration of a recording adjustment device according to an embodiment of the present technique.

A recording adjustment device 1 includes an optical pickup portion 11, a preprocessing portion 12, a clock reproducing portion 13, a signal processing portion 14, an estimation portion 15, and a laser driver control portion 16. A drive of the recording adjustment device 1 is equipped with an optical disc 2 for a high-linear density complying with predetermined standards. A configuration of an interface or the like which acquires data which is inputted thereto from an external apparatus and is to be recorded in the optical disc 2, for example, is provided in the recording adjustment device 1. Data (information data) becoming a recording target is also inputted to the signal processing portion 14.

The optical pickup portion 11 emits a laser beam in accordance with the control made by the laser driver control portion 16 to record the data in the optical disc 2. In addition, the optical pickup portion 11 reads the data which is recorded by emitting the laser beam. The optical pickup portion 11 outputs a regenerative signal obtained by reading the data to the preprocessing portion 12.

The preprocessing portion 12 executes preprocessing such as A/D conversion, waveform equalization, and the like for the regenerative signal supplied thereto from the optical pickup portion 11, and outputs the reproduced data. The reproduced data outputted from the preprocessing portion 12 is supplied to the clock reproducing portion 13, the signal processing portion 14, and the estimation portion 15.

The clock reproducing portion 13 produces a clock signal on the basis of the reproduced data supplied thereto from the preprocessing portion 12, and outputs the resulting clock signal to the signal processing portion 14. The pieces of processing in the signal processing portion 14 are executed with the clock signal produced by the clock reproducing portion 13 as the reference.

The signal processing portion 14 repetitively executes the recording compensation processing described above on the basis of the reproduced data supplied thereto from the preprocessing portion 12, and the recording pattern preserved in an internal memory. The signal processing portion 14 outputs an LDD control signal in accordance with which the light emission of the laser beam is controlled to the laser driver control portion 16 to cause the laser driver control portion 16 to record the data as the recording target.

The estimation portion 15 estimates the reproduced data supplied thereto from the preprocessing portion 12 on the basis of a bit error rate or the like, and controls the processing of the signal processing portion 14 in accordance with the estimation result. The estimation portion 15 functions as a processing control portion for controlling the recording compensation processing in the signal processing portion 14. Integrated-Maximum Likelihood Sequence Estimation (iMLSE) or the like, for example, may be used for the estimation of the reproduced data. iMLSE is an estimation value which is used as an estimation index for a regenerative signal quality.

The estimation portion 15 causes the signal processing portion 14 to repetitively execute the round processing described above until the estimation result of the reproduced data becomes a value within a predetermined standard. When the estimation result of the reproduced data becomes the value within the predetermined standard, the estimation portion 15 ends the repetition of the round processing. The recording of the data in and after this stage is carried out by using the newest recording strategy.

The laser driver control portion 16 controls the light emission of the laser diode provided in the optical pickup portion 11 in accordance with the LDD control signal supplied thereto from the signal processing portion 14.

<2-2. Example 1 of Configuration of Signal Processing Portion>

Figure 11:
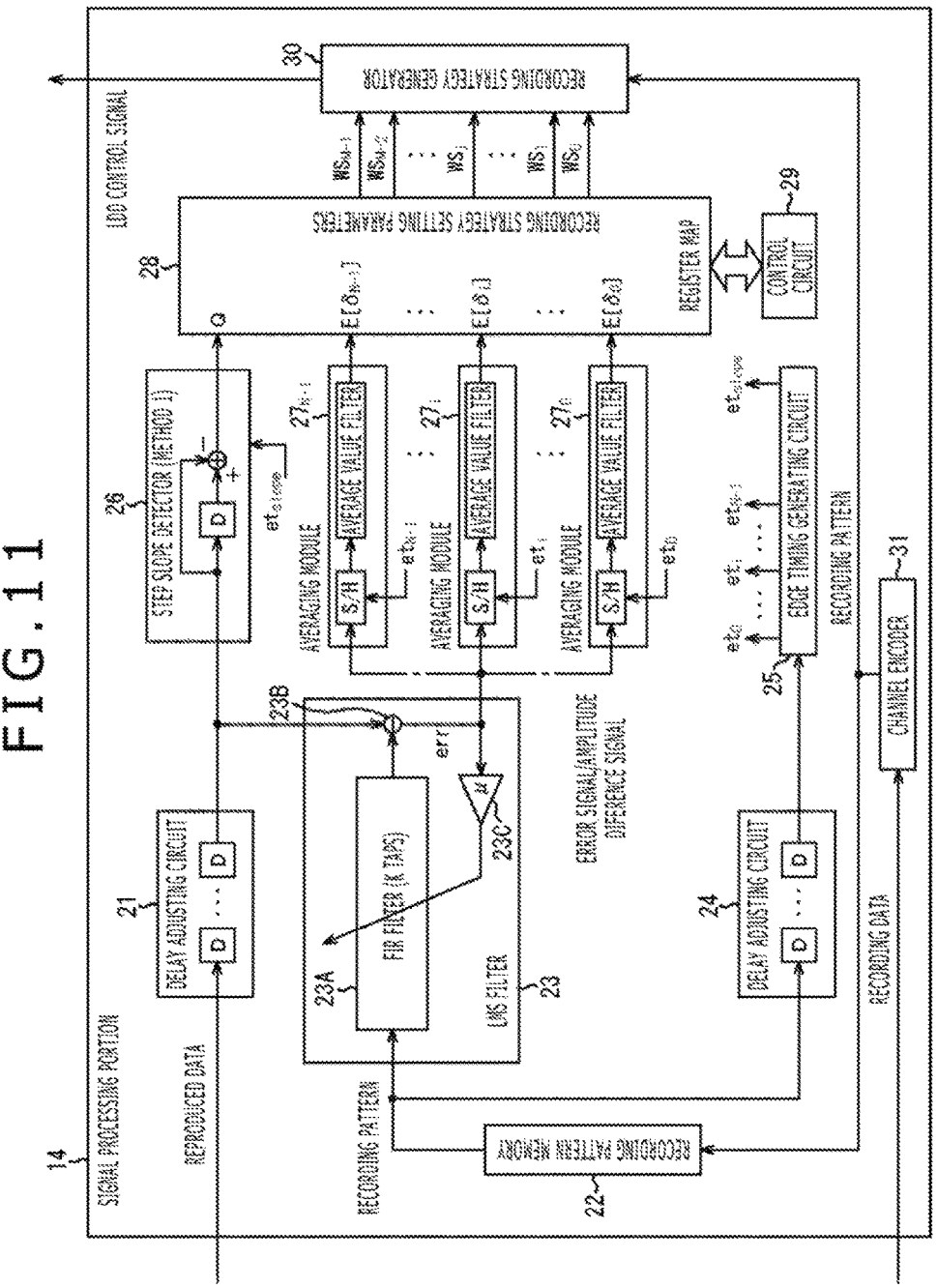
FIG. 11 is a block diagram depicting an example of a configuration of a signal processing portion of FIG. 10.

FIG. 11 is a block diagram depicting an example of a configuration of the signal processing portion 14 of FIG. 10.

The signal processing portion 14 having the configuration depicted in FIG. 11 carries out the recording compensation by using the Q value calculated by using the first calculation method described above.

The signal processing portion 14 includes a delay adjusting circuit 21, a recording pattern memory 22, an LMS filter 23, a delay adjusting circuit 24, an edge timing generating circuit 25, a step slope detecting circuit 26, average value calculating circuits $27_0$ to $27_{N-1}$, a register map 28, a control circuit 29, a recording strategy generating circuit 30, and a channel encoder 31. The reproduced data outputted from the preprocessing portion 12 is inputted to the delay adjusting circuit 21. In addition, the recording data inputted from the outside is inputted to the channel encoder 31.

The delay adjusting circuit 21 includes a plurality of delay elements. The delay adjusting circuit 21 delays the bits constituting the reproduced data in the delay elements, and outputs the reproduced data in accordance with a timing at which the recording pattern is inputted to the LMS filter 23. The reproduced data outputted from the delay adjusting circuit 21 is supplied to a subtraction portion 23B of the LMS filter 23.

The recording pattern memory 22 stores therein the recording pattern representing the pattern of the marks/spaces recorded in the optical disc 2. At the time of update of the recording strategy, the recording pattern memory 22 reads out the recording pattern stored at the time of recording of the data recorded at the last minute, and outputs the recording pattern thus read out. The recording pattern outputted from the recording pattern memory 22 is supplied to the FLR filter 23A of the LMS filter 23.

The LMS filter 23 includes the FIR filter 23A the number of taps of which is K, the subtraction portion 23B, and a feedback coefficient portion 23C. The FIR filter 23A carries out the convolution arithmetic operation for the recording pattern supplied thereto from the recording pattern memory 22 by using the filter coefficient updated by the feedback coefficient portion 23C, and outputs the arithmetic operation result. The subtraction portion 23B obtains a difference between the result of the convolution arithmetic operation, and the reproduced data supplied thereto from the delay adjusting circuit 21, and outputs the resulting difference as an error signal. The feedback coefficient portion 23C updates the filter coefficient of the FIR filter 23A so as to converge the error signal supplied from the subtraction portion 23B.

The LMS filter 23A having such a configuration identifies the impulse response of the system on the basis of the recording pattern and the reproduced data. In the case where the error signal is converged, the LMS filter 23 stops the update of the filter coefficient of the FIR filter 23A to hold the filter coefficient. The output from the FIR filter 23A after the identification corresponds to the expected waveform which is produced by convoluting the impulse response. The LMS filter 23 outputs an error signal between the expected waveform and the reproduced data as the amplitude difference δ to the average value calculating circuits $27_0$ to $27_{N-1}$.

The delay adjusting circuit 24 includes a plurality of stages of delay elements. The delay adjusting circuit 24 adjusts the output timings of the recording pattern and the amplitude difference δ. The recording pattern outputted from the delay adjusting circuit 24 is supplied to the edge timing generating circuit 25.

The edge timing generating circuit 25 outputs timing signals $et_0$ to $et_{N-1}$ representing timings of the edge positions on the basis of the recorded pattern supplied from the delay adjusting circuit 24 to the corresponding average value calculating circuits $27_0$ to $27_{N-1}$. A suffix i in the average value calculating circuits $27_0$ to $27_{N-1}$ represents the number (0 to N-1) of the edge type. In this example, it is assumed that there are N kinds of edge types.

In addition, the edge timing generating circuit 25 detects the edge constituted by the long mark/long space used for calculation of the Q value, and outputs a timing signal $et_{slope}$ representing the timing concerned to the step slope detecting circuit 26.

In the case where the timing signal $et_{slope}$ is supplied, the step slow detecting circuit 26 calculates the Q value on the basis of the reproduced data containing the edge constituted by the long mark/long space and supplied thereto from the delay adjusting circuit 21. The step slope detecting circuit 26 outputs a difference between the amplitude value of the focused edge position of the reproduced data, and the amplitude value located in the previous position by 1T as the Q value to the register map 28, and preserves the resulting Q value.

Each of the average value calculating circuits $27_0$ to $27_{N-1}$ includes a sample-and-hold (S/H) circuit, and an average value filter. The average value calculating circuits $27_0$ to $27_{N-1}$ preserve the amplitude differences δ in the edge positions of the corresponding edge types in the S/H circuits, and obtain the average values $E[\delta_i]$ in the respective averaging filters. The average value calculating circuits $27_0$ to $27_{N-1}$ output the average values $E[\delta_i]$ of the amplitude differences to the register map 28, and preserve the average values $E[\delta_i]$ of the amplitude differences in the register map 28.

The control circuit 29, for example, includes a microcomputer. The control circuit 29 divides the average value $E[\delta_i]$ of the amplitude differences preserved in the register map 28 by the Q value to obtain the edge shift presumption amount $s_i$ for each edge type. In addition, the control circuit 29 multiplies the edge shift presumption amount $s_i$ by the correction coefficient α, and carries out the sign inversion, thereby obtaining the edge shift correction amount $s_i'$.

The control circuit 29 updates the setting parameter $WS_j$ of the recording strategy on the basis of the edge shift correction amount $s_i'$, and sets the setting parameter $WS_j$ after the update in the recording strategy generating circuit 30. A suffix j represents the number (0 to M-1) of the setting parameter. In this example, it is assumed that there are M kinds of setting parameters. The kinds M of setting parameters WS, and the kinds N of edge types may have the same number or may have different numbers.

The recording strategy generating circuit 30 outputs the LDD control signal in accordance with which the data is to be recorded in the optical disc 2 to the laser driver control portion 16. The LDD control signal outputted from the recording strategy generating circuit 30 becomes a signal responding to the setting parameter $WS_j$ set by the control circuit 29.

The channel encoder 31, for example, carries out 17 Parity Preserve/Prohibit RMTR (17PP) modulation for the new data becoming the recording target after the setting parameter $WS_j$ is set by the control circuit 29, and outputs the recording pattern obtained by carrying out the modulation to the recording strategy generating circuit 30. In addition, the channel encoder 31 outputs the recording pattern of the marks/spaces of the new data becoming the recording target to the recording pattern memory 22, and causes the recording pattern memory 22 to preserve the recording pattern.

<2-3. Example 2 of Configuration of Signal Processing Portion>

Figure 12:
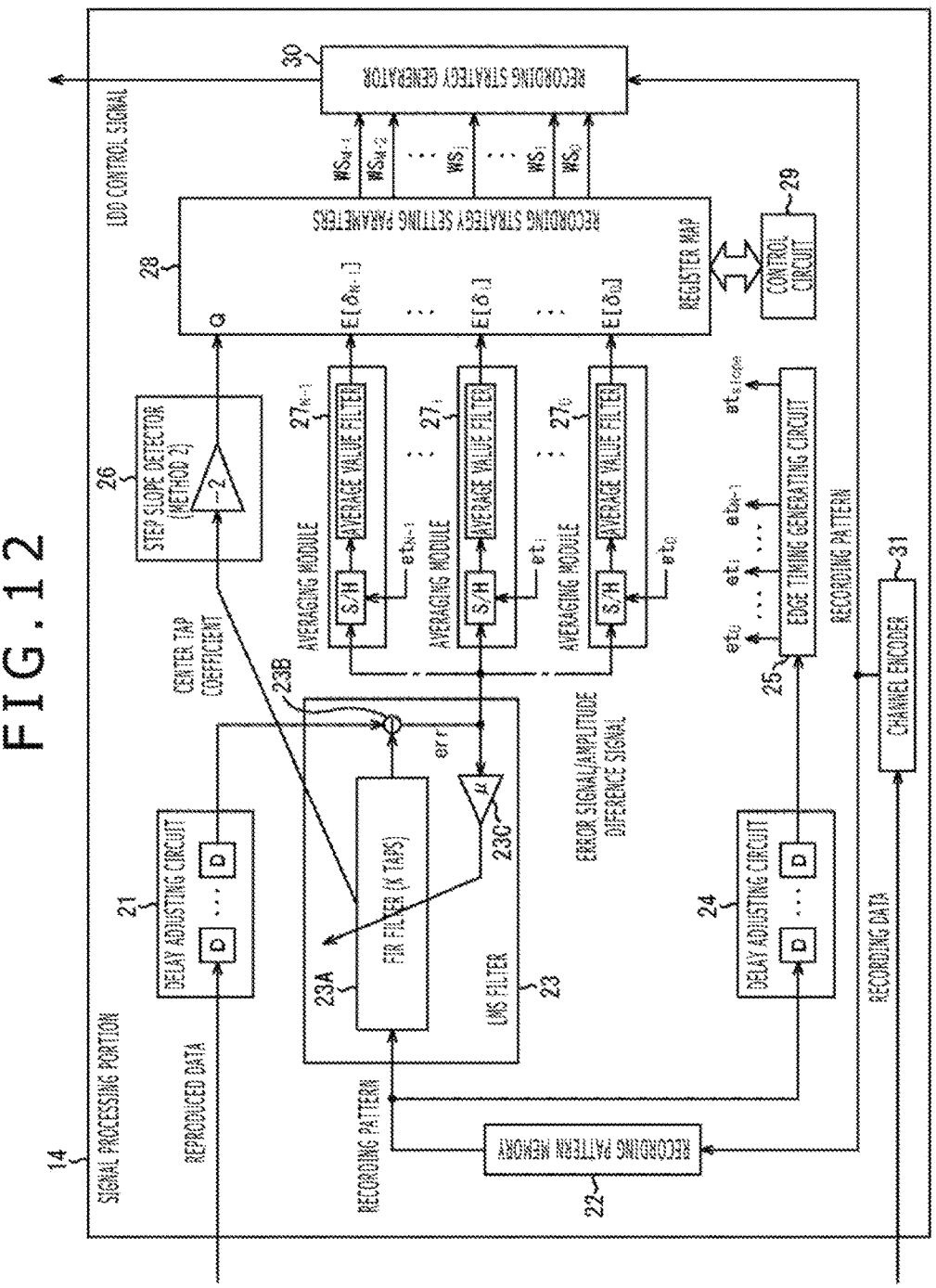
FIG. 12 is a block diagram depicting an example of another configuration of the signal processing portion of FIG. 10.

FIG. 12 is a block diagram depicting another example of the configuration of the signal processing portion 14 of FIG. 10.

The signal processing portion 14 having the configuration depicted in FIG. 12 carries out the recording compensation by using the Q value calculated by using the second calculation method described above. Of the configurations depicted in FIG. 12, the same configurations as those depicted in FIG. 11 are assigned the same reference symbols. A repeated description will be suitably omitted herein.

In the case where a center tap coefficient is supplied from the FIR filter 23A, the step slope detecting circuit 26 multiplies a peak value of the impulse response represented by the center tap coefficient by −2, thereby calculating the Q value.

After the identification of the impulse response of the system, the center tap coefficient is supplied from the FIR filter 23A to the step slope detecting circuit 26. The step slope detecting circuit 26 outputs the Q value obtained by the calculation to the register map 28 to preserve the Q value in the register map 28.

<2-4. Recording Adjustment Processing of Recording Adjustment Device>

Here, a description will be given with respect to recording adjustment processing of the recording adjustment device 1 with respect to a flow chart of FIG. 13.

Figure 13:
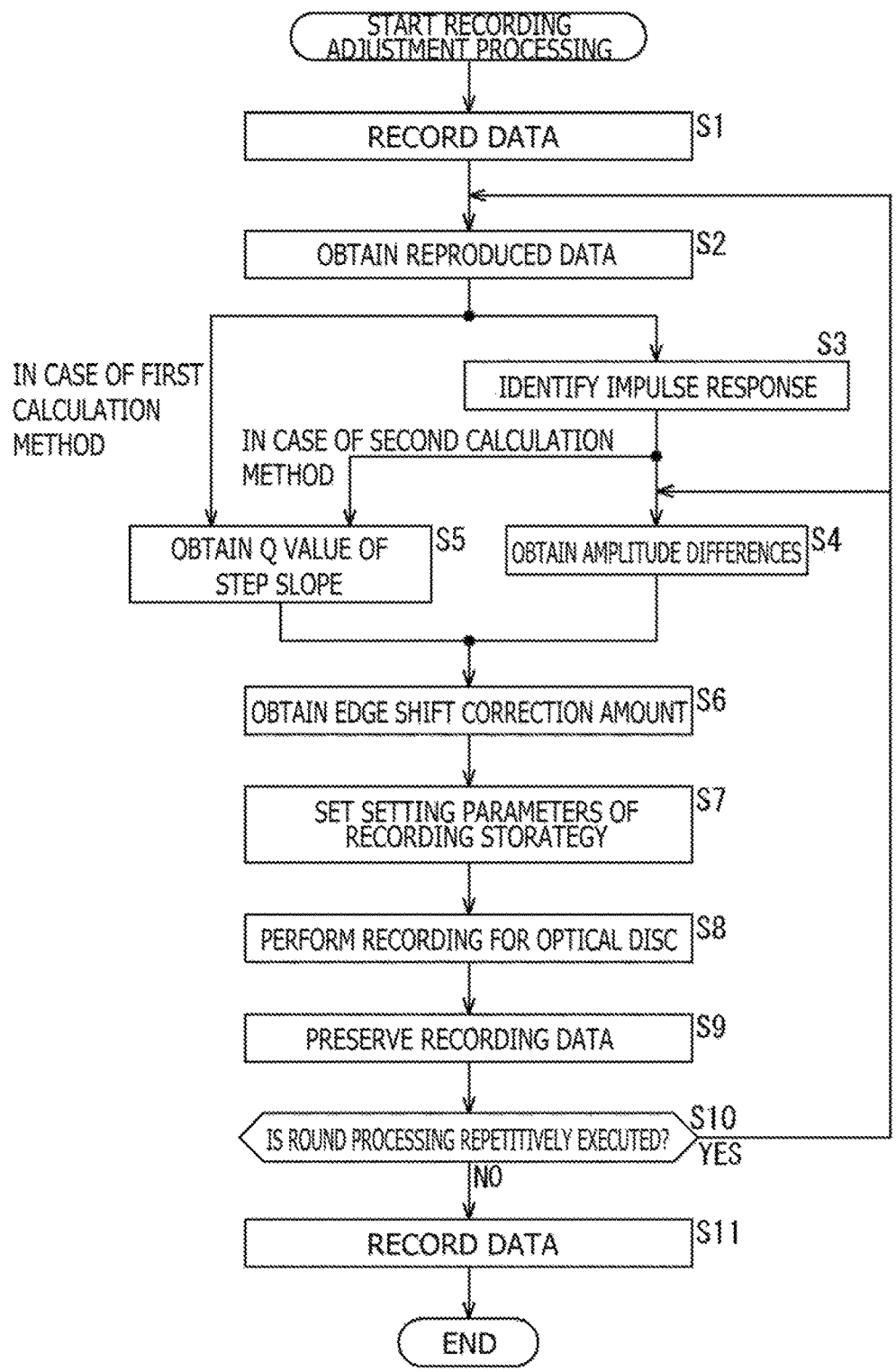
FIG. 13 is a flow chart explaining recording adjustment processing.

The processing of FIG. 13, for example, is started when the drive of the recording adjustment device 1 is equipped with the optical disc 2, and the data as the recording target is inputted to the recording adjustment device 1.

In Step S1, the signal processing portion 14 controls the laser driver control portion 16 in such a way that the predetermined data contained in the inputted data is recorded in the optical disc 2. In addition, the signal processing portion 14 stores the recording pattern representing the pattern of the marks/spaces of the recorded data in the recording pattern memory 22. The processing executes herein is so-called preparation processing before the recording compensation is carried out.

In Step S2, the optical pickup portion 11 emits the laser beam, thereby reproducing the data recorded at the last minute. The preprocessing is executed for the regenerative signal in the preprocessing portion 12, and the reproduced signal is supplied to the signal processing portion 14. The signal processing portion 14 obtains the reproduced data.

In Step S3, the LMS filter 23 of the signal processing portion 14 identifies the impulse response of the system on the basis of the recording pattern read out from the recording pattern memory 22, and the reproduced data. When the impulse response of the system is identified, the amplitude difference δ as the difference between the output from the FIC filter 23A representing the expected waveform, and the error signal is supplied from the LMS filter 23 to the average value calculating circuit $27_0$ to $27_{N-1}$. The reproduction of the data s repetitively carried out until the impulse response of the system is identified, and the amplitude difference δ is outputted.

In Step S4, the average value calculating circuit $27_0$ to $27_{N-1}$ obtain the average values $E[\delta_i]$ of the amplitude differences δ every edge type.

In Step S5, the step slope detecting circuit 26 obtains the Q value of the step slope. Specifically, the step slope detecting circuit 26 obtains the Q value of the step slope on the basis of the reproduced data containing the edge constituted by the long mark/long space in accordance with the first calculation method. In addition, the step slope detecting circuit 26 obtains the Q value on the basis of the center tap coefficient of the FIR filter 23A identified in accordance with the second calculation method.

After the amplitude difference δ is obtained in Step S4, and the Q value of the step slope is obtained in Step S5, in Step S6, the control circuit 29 divides the average value $E[\delta_i]$ of the amplitude differences by the Q value to obtain the edge shift presumption amount $s_i$ for each the edge type. In addition, the control circuit 29 multiplies the edge shift presumption amount $s_i$ by the correction coefficient α, and carries out the sign inversion to obtain the edge shift correction amount $s_i'$.

In Step S7, the control circuit 29 updates the setting parameter $WS_j$ of the recording strategy on the basis of the edge shift correction amount $s_i'$, and sets the setting parameter $WS_j$ in the recording strategy generating circuit 30.

In Step S8, the recording strategy generating circuit 30 outputs the LDD control signal responding to the data as the recording target to the laser driver control portion 16 by using the setting parameter $WS_j$ set by the control circuit 29, and instructs the laser driver control portion 16 to record the data in the optical disc 2. The data as the recording target is supplied from the channel encoder 31.

In Step S9, the control circuit 29 issues an instruction to preserve the recording pattern representing the pattern of the marks/spaces of the recorded data in the recording pattern memory 22. In accordance with the instruction issued from the control circuit 29, the channel encoder 31 preserves the recording pattern in the recording pattern memory 22.

In Step S10, the estimation portion 15 carries out the estimation of the reproduced data, and determines whether or not the round processing is repetitively executed. In the case where it is determined in Step S10 that the round processing is repetitively executed, processing in and after the processing in Step S2 is repetitively executed. As described above, the identification (Step S3) of the impulse response, and the calculation (Step S5) of the Q value can be suitably omitted herein.

In the case where since it is determined in Step S10 that since the estimation result of the reproduced data becomes sufficiently satisfactory, the subsequent round processing is not executed, in Step S11, the recording of the subsequent data is carried out. That is to say, the signal processing portion 14 controls the laser driver control portion 16 in such a way that the unrecorded data contained in the data as the recording target is recorded in the optical disc 2 by using the newest setting parameter $WS_j$ of the recording strategy. When it is completed to record the data inputted as the recording target in the optical disc 2, the processing is ended.

Incidentally, even after it is determined in Step S10 that the round processing is not executed, suitably, the round processing can be started again. For example, the round processing is suitably started again, and the setting parameter $WS_j$ of the recording strategy is updated in response to the recording position on the optical disc 2, the elapsed time from the recording start or the like. In addition, in starting the round processing again, the identification of the impulse response, and the calculation of the Q value of the step slope may be omitted herein. In this case, after the processing returns back to Step S4, and in Step S4, and the amplitude difference δ is obtained, the processing in and after Step S6 is executed.

«3. With Respect to Recording Strategy»

Figure 14:
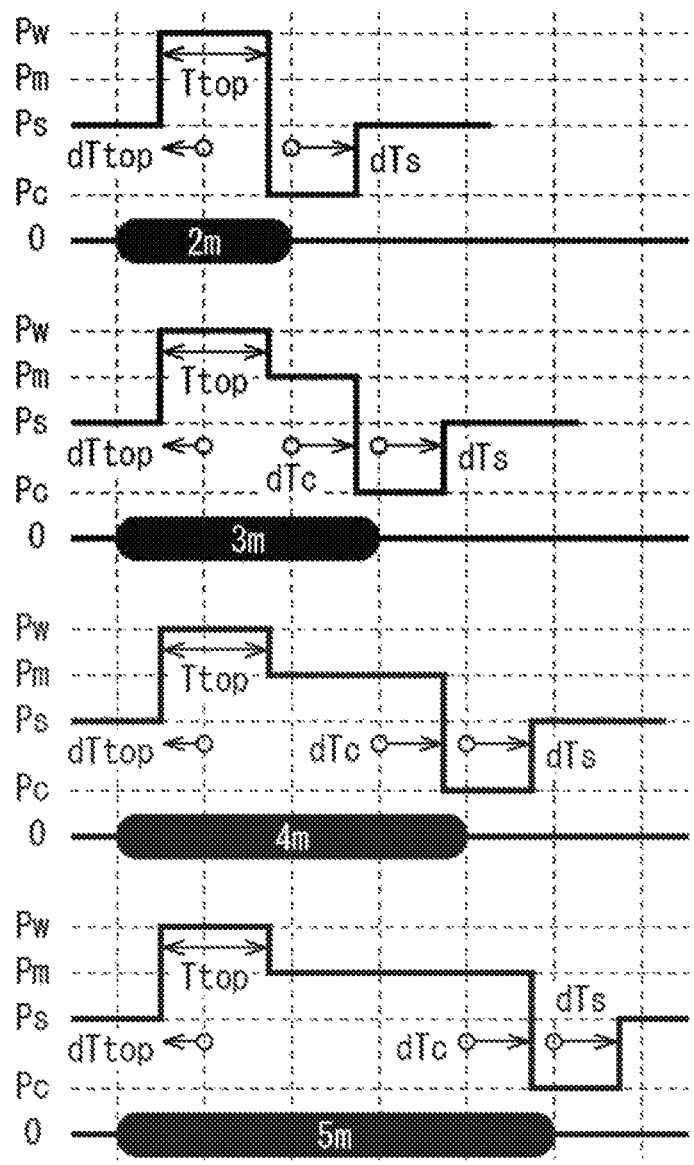
FIG. 14 is a timing chart depicting an example of a recording strategy.
Figure 15:
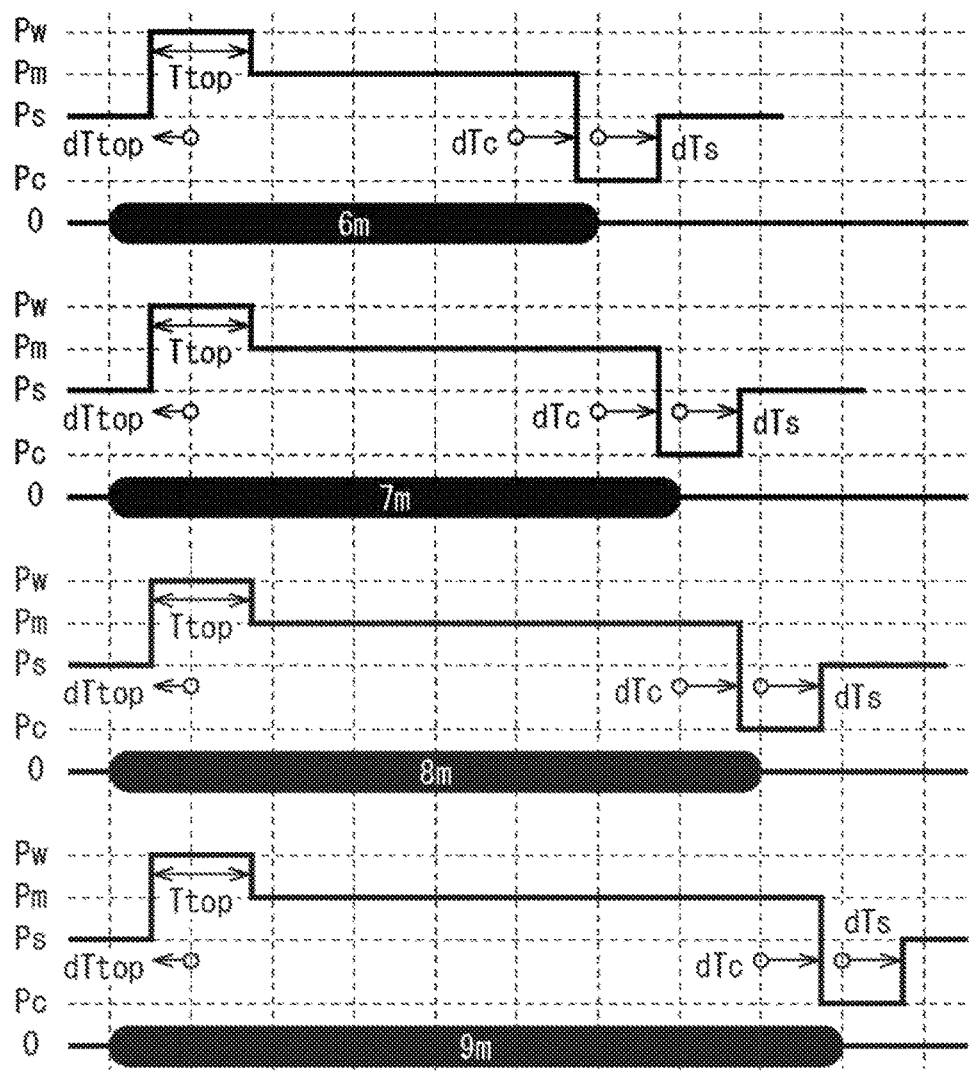
FIG. 15 is a timing chart depicting an example of the recording strategy.

FIG. 14 and FIG. 15 are timing charts depicting examples of the recording strategy.

In the recording adjustment device 1, an L-shape recording strategy, for example, depicted in FIG. 14 and FIG. 15 is used as the recording strategy. The L-shape recording strategy is one of the recording strategies decided in the BDXL standards.

As depicted in FIG. 14 and FIG. 15, each of the marks is expressed by four parameters: dTop; Ttop; dTc; and dTs except for the case of the 2T mark. The 2T mark is expressed by three parameters: dTop; Ttop; and dTs. The setting parameters $WS_j$ including a combination of dTop, Ttop, dTc, and dTs is set by, for example, M kinds in response to the edge type.

FIG. 16 is a diagram depicting an example of the setting parameters $WS_j$.

TABLES T1 to T4 in an upper stage depict values of dTop, Ttop, dTc, and dTs for each edge type, respectively. The control circuit 29 manages such TABLES T1 to T4, and obtains update amount ΔdTtop, ΔTtop, ΔdTc, and ΔdTs of the parameters on the basis of the edge shift correction amount $s_i'$.

Figure 17:
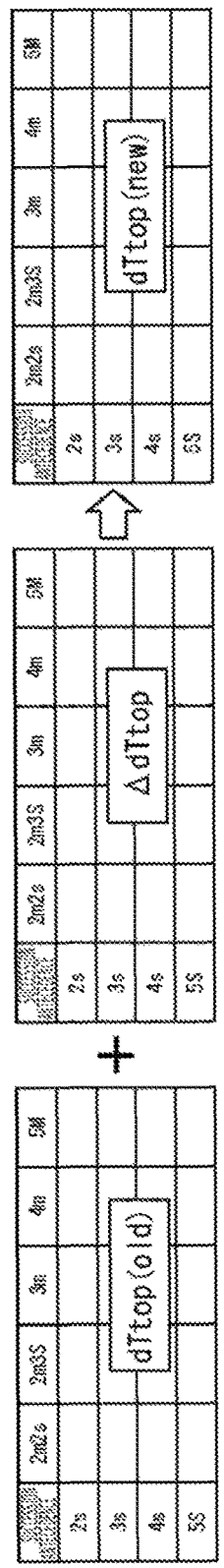
FIG. 17 is a diagram depicting an example of update of the setting parameters.

The control circuit 29, as depicted in FIG. 17, updates TABLES exhibiting the values of dTop, Ttop, dTc, and dTs on the basis of ΔdTtop, ΔTtop, ΔdTc, and ΔdTs, and sets the values of TABLES after the update as the setting parameters $WS_j$ in the recording strategy generating circuit 30. In an example of FIG. 17, TABLE T1 exhibiting the value of dTop is updated on the basis of ΔdTtop obtained on the basis of the edge shift correction amount $s_i'$.

Although in this example, the L-shape recording strategy is used, other recording strategy such as an (n−1) recording strategy or a Castle recording strategy can also be used.

«4. Simulation Results»

A description will now be given with respect to simulation results in the case where the present recording compensation method is used. It should be noted that the results depicted hereinafter are results in the case where the optical disc of LD50 is used, and the L-shape recording strategy for BDXL is adopted as the recording strategy.

<4-1. Influence of Correction Coefficient α>

Figure 18:
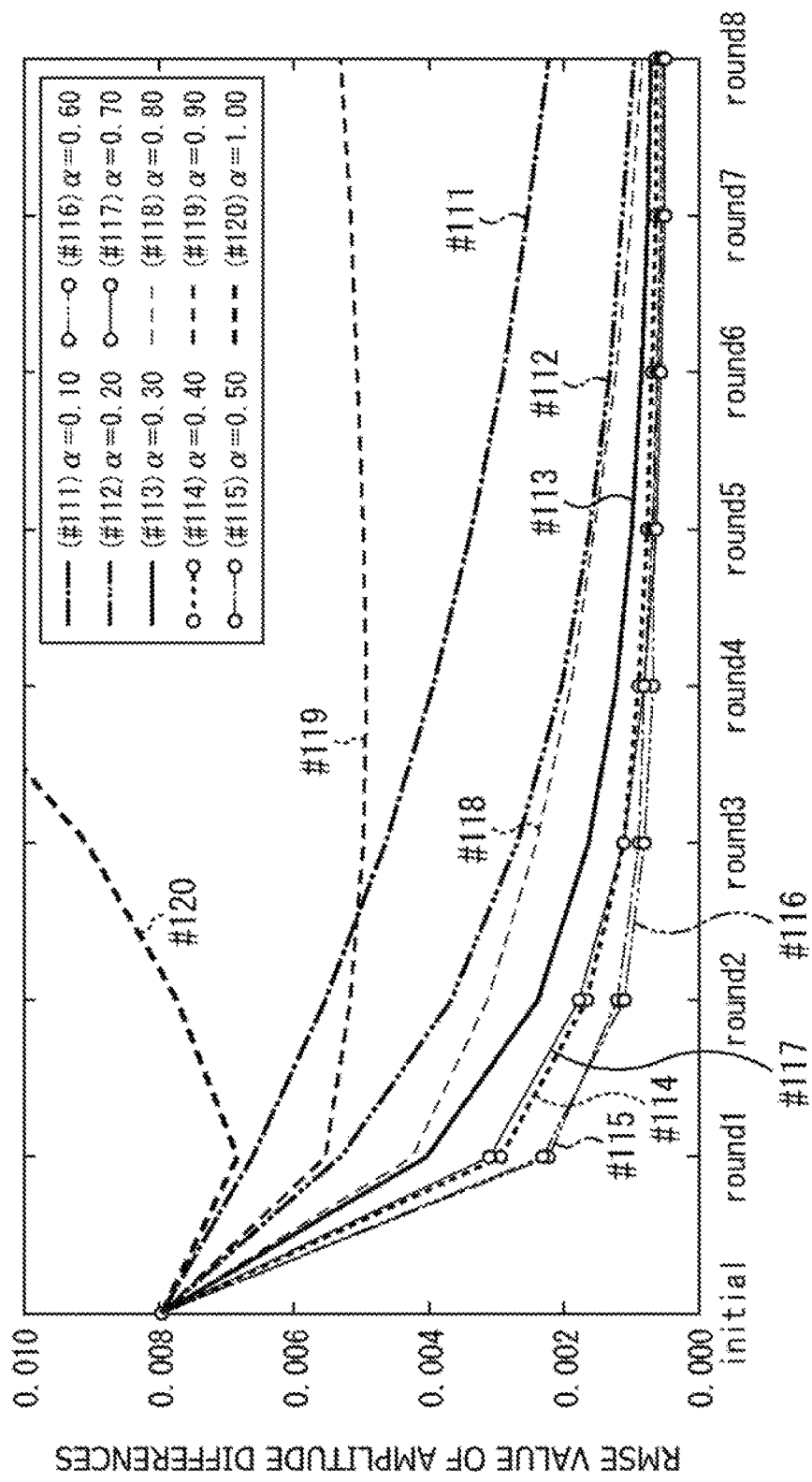
FIG. 18 is a graphical representation depicting a simulation result.

FIG. 18 is a graphical representation depicting a simulation result responding to the correction coefficient α.

An axis of ordinate of FIG. 18 represents an RMSE value of the amplitude difference, and an axis of abscissa represents a number of round. A Root Mean Squared Error (RMSE) value of the amplitude differences is one of the estimation indices of the magnitude differences, and represents the degree of estrangement from an ideal state (value 0) having no edge shift.

Results #111 to #120 exhibit simulation results in the case where the correction coefficient α is changed on 0.10 by 0.10 basis in the range of 0.10 to 1.00, respectively. It is understood that the RMSE values are sufficiently converged in the range of $0.4 \leq \alpha \leq 0.7$.

It should be noted that the RMSE value of the amplitude differences is expressed by following Expression (13). In Expression (13), N is the total number of edges, and $y_i$ is a value of the amplitude difference in the i-th edge, and Y is the amplitude difference (=0) in the ideal state.

[Expression 13]

$$RMSE = \sqrt{\frac{1}{N} \sum_{i=0}^{N-1} (y_i - Y)^2} \quad (13)$$

In the recording adjustment device 1, as described above, the predetermined value within the range of 0.3 to 0.8, for example, is used as the correction coefficient α. As a result, the recording adjustment device 1 repetitively executes the recording compensation processing, thereby enabling the amplitude difference to be converged.

<4-2. Change in Amplitude Difference Average Value>

Figure 19:
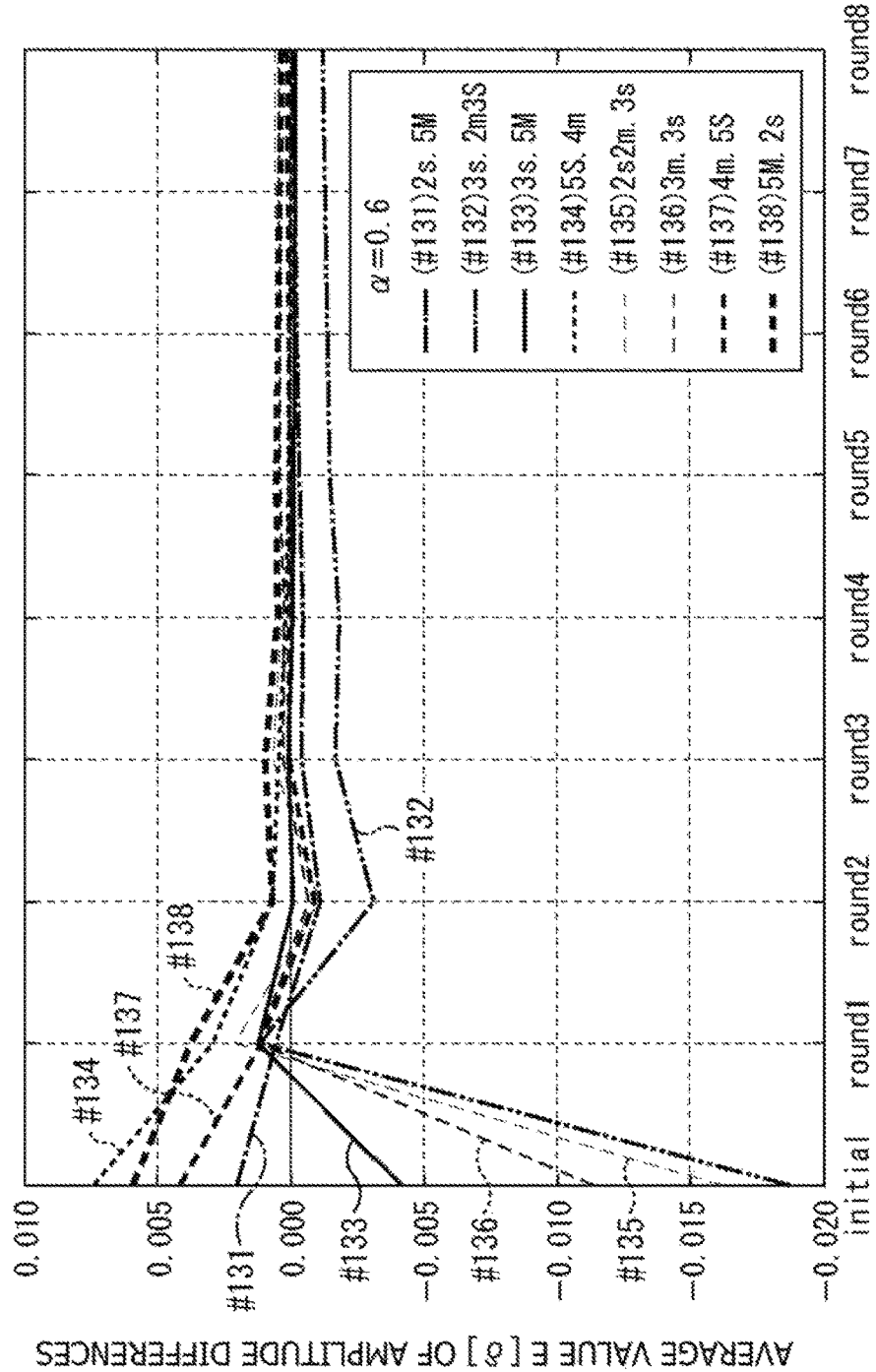
FIG. 19 is another graphical representation depicting a simulation result.

FIG. 19 is a graphical representation depicting simulation results of a change in average value of the amplitude differences for each edge type.

An axis of ordinate of FIG. 19 represents the average value of the amplitude differences, and an axis of abscissa represents a number of round. The correction coefficient α is 0.60. The results #131 to #138 represent the results in which the edge types are '2s.5M,' '3s.2m3S,' '3s.5M,' '5S.4m,' '2s2m.3s,' '3m.3s,' '4 m.5S,' and '5M.2s,' respectively. It is understood that even in any of the edge types, by executing the processing of approximately eight rounds, the amplitude differences become sufficiently small.

In the recording adjustment device 1, the recording compensation processing is repetitively executed by, for example, eight rounds. The recording of the data in and after the eight rounds, for example, is carried out by using the setting parameters of the recording strategy updated in the eighth-round processing. As a result, the amplitude differences can be suppressed irrespective of the edge type.

<4-3. Change in Binary Jitter Value>

Figure 20:
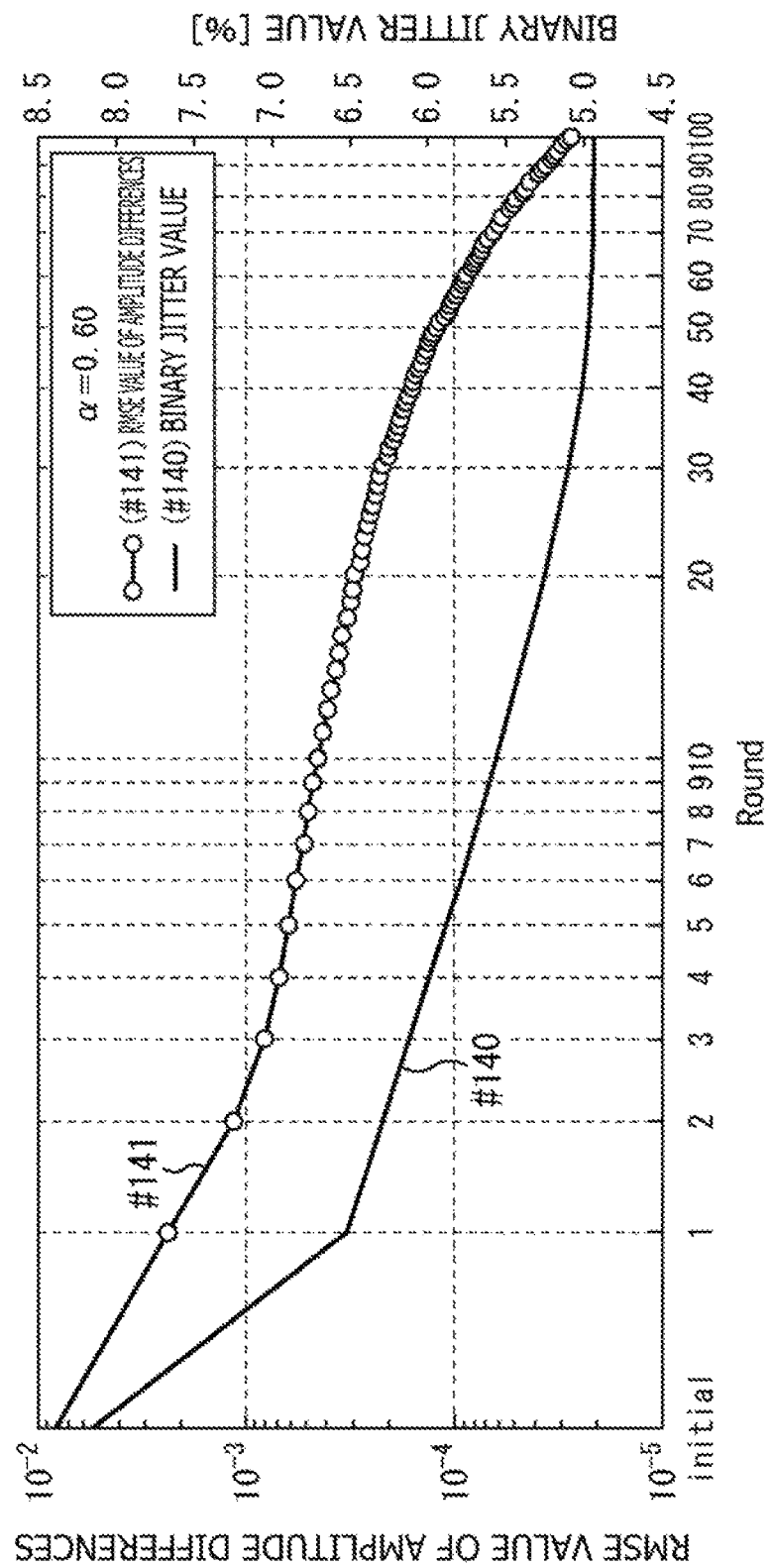
FIG. 20 is still another graphical representation depicting a simulation result.

FIG. 20 is a graphical representation depicting the simulation results of the binary jitter of the regenerative signal.

An axis of ordinate of FIG. 20 represents the jitter value, and an axis of abscissa represents a number of round. The correction coefficient α is 0.60. As depicted in a result #140, by repetitively executing the round processing by 100 times, the binary jitter value obtained from the regenerative signal is improved from 8.1% at the time of start of the processing to 4.9%.

<4-4. Effects>

As described above, according to the present recording compensation method, even in the case where the data is recorded in the optical disc for the high-linear density such as the linear density of 40 GB (LD40) or more, the recording compensation can be realized. That is to say, even in the state in which each of the edges is largely influenced by the intersymbol interference, the adjustment of the edge position of the mark can be carried out.

In addition, according to the present recording compensation method, since the similar processing is repetitively executed, even in the case where the incorrect correction is carried out, with respect to the data in and after this case, the contents of the correction can be revised through the processing.

Moreover, the present recording compensation method can be realized by a filter arithmetic operation (an arithmetic operation by the LMS filter, and an arithmetic operation of the average value of the amplitude differences) by the hardware, and an arithmetic operation by the firmware of the control circuit 29. Therefore, the circuit and the mounting of the function are easy to carry out.

Since the recording compensation can be carried out and estimated by using the user data area, it is unnecessary to secure a dedicated test area.

In addition, the setting parameters of the recording strategy can be updated by using the various data recorded in the user data area. Therefore, it becomes possible to enhance the versatility of the setting parameters of the recording strategy.

Moreover, it becomes possible to improve the signal quality while the data is actually recorded in the user data area.

«5. Modified Changes»

At the time of recording of certain data, the different pieces of data recorded at the last minute are reproduced to be used for the update of the recording strategy. However, the recorded data used for the update of the recording strategy may be rewritten by the same data.

For example, in the case where the data D1, data D2, and D3 described above are recorded in order, firstly, the data D1 is recorded by using the default recording strategy. At this time, the recording pattern representing the pattern of the marks/spaces of the data D1 is preserved in the memory.

Next, the impulse response of the system is identified by using the reproduced data obtained by reproducing the data D1 recorded at the last minute, and the recording pattern preserved in the memory. In addition, the edge shift presumption amount, the edge shift correction amount, and the like are calculated, thereby updating the recording strategy. Here, the data D1 is recorded by using the recording strategy which is updated in the form of, for example, the overwriting to the recorded data D1.

The update of the recording strategy using such recorded data D1, and the overwriting of the data D1 using the updated recording strategy are repetitively carried out, thereby enabling the edge position of the data D1 to be brought close to the ideal position.

After the end of the processing with the data D1 as the target, the similar processing with the data D2 and D3 as the target is executed. In this case, a rewritable recording medium is used as the optical disc 2.

In addition, although in the foregoing, the description has been given with respect to the case where the High-to-Low media is used, Low-to-High media can also be used.

Example of Configuration of Computer

The series of pieces of processing described above can be executed by the hardware, or by the software. In the case where the series of pieces of processing described above are executed by the software, the program constituting that software is installed in the computer incorporated in dedicated hardware, a general-purpose personal computer or the like from a program recording medium.

Figure 21:
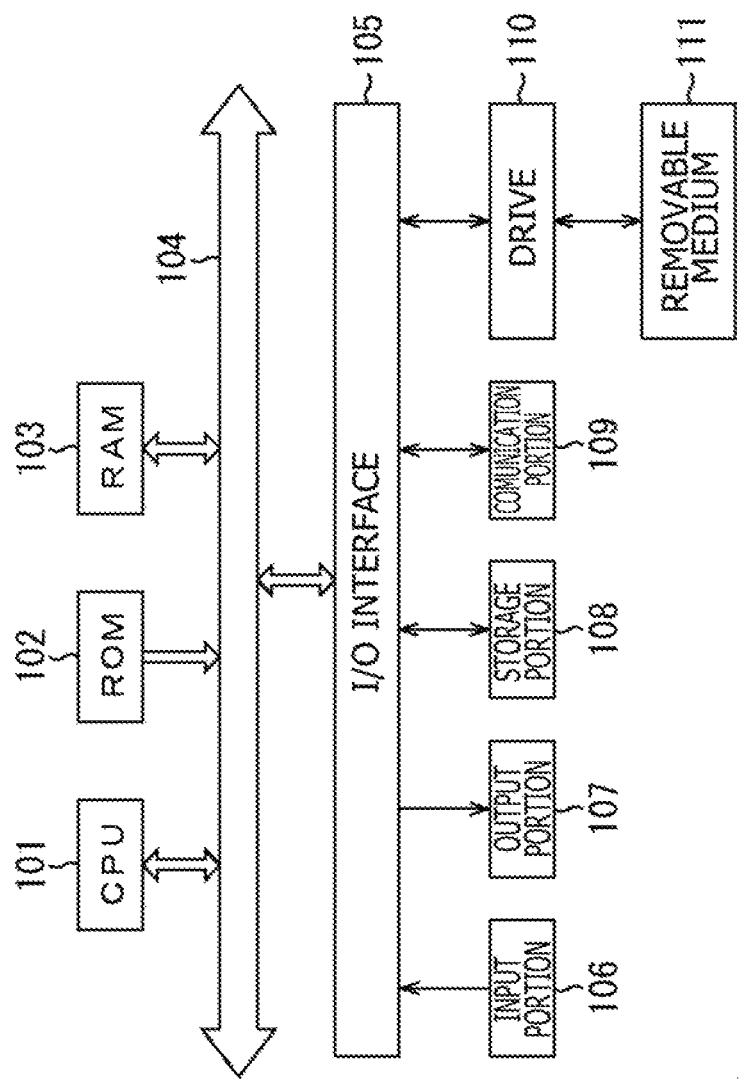
FIG. 21 is a block diagram depicting an example of a configuration of a computer.

FIG. 21 is a block diagram depicting an example of a series of pieces of processing described above in accordance with a program.

A Central Processing Unit (CPU) 101, a Read Only Memory (ROM) 102, and a Random Access Memory (RAM) 103 are connected to one another through a bus 104.

An I/O interface 105 is further connected to the bus 104. An input portion 106 including a keyboard, a mouse or the like, and an output portion 107 including a display, a speaker or the like are connected to the I/O interface 105. In addition, a storage portion 108 including a hard disc, a non-volatile memory or the like, a communication portion 109 including a network interface or the like, and a drive 110 for driving a removable medium 111 are connected to the I/O interface 105.

In the computer configured in the manner as described above, the CPU 101, for example, loads the program stored in the storage portion 108 into the RAM 103 through the I/O interface 105 and the bus 104, and executes the program, thereby executing the series of pieces of processing described above.

The program which is to be executed by the CPU 101, for example, is recorded in the removable medium 111, or is presented through a wireless or wired transmission medium such as a local area network, the Internet, or a digital broadcasting, and is installed in the storage portion 108.

It should be noted that the program which is to be executed by the computer may be a program in accordance with which the pieces of processing are executed in time series along the order described in this description, or may be a program in accordance with which the pieces of processing are executed in parallel or at a necessary timing when a call is made.

The effect described in the present description is merely an exemplification, and is by the means limited, and other effects may be offered.

The embodiments of the present technique are by no means limited to the embodiment described above, and various changes can be made without departing from the subject matter of the present technique.

Examples of Combinations of Configurations

The present technique can also adopt the following constitutions.

(1)

A recording adjustment device, including:

a storage portion configured to store a recording pattern of marks and spaces of data recoded in a recording medium;

a filter processing portion configured to identify an impulse response of a system on the basis of a regenerative signal obtained by reproducing the data recorded in the recording medium, and the recording pattern stored in the storage portion;

a calculation portion configured to calculate a difference in amplitude between an output from the filter processing portion after the identification of the impulse response, and the regenerative signal every edge type;

a detection portion configured to detect a slope of a step response in a vicinity of an edge position;

a control portion configured to calculate a correction amount of an edge position for each edge type on the basis of the amplitude difference and the slope of the stop response, correct the edge position in response to the correction amount, cause data as a recording target to be recorded in the recording medium, and cause the recording pattern of marks and the spaces of the data as the recording target to be stored in the storage portion; and a processing control portion configured to cause recording compensation processing including at least the processing by the calculation portion, and the processing by the control portion of the processing by the filter processing portion, the processing by the calculation portion, the processing by the detection portion, and the processing by the control portion to be repetitively executed by changing the data becoming a target of reproduction, and the data as the recording target.

(2)

The recording adjustment device according to (1) described above, in which after the data as the recording target is recorded in the recording medium, the filter processing portion identifies the impulse response of the system on the basis of the regenerative signal obtained by reproducing the data as the recording target recorded in the recording medium, and the recording pattern newly recorded in the storage portion.

(3)

The recording adjustment device according to (1) or (2) described above, in which the data becoming the target of the reproduction is data recorded in the recording medium by the recording compensation processing at the last minute.

(4)

The recording adjustment device according to any one of (1) to (3) described above, in which the detection portion detects a difference between the amplitude of the regenerative signal in an edge position constituted by a mark having a predetermined length or more, and a space having a predetermined length or more, and the amplitude of the regenerative signal in a position shifted at a distance corresponding to one clock from the edge position as the slope of the step response.

(5)

The recording adjustment device according to any one of (1) to (3) described above, in which the detection portion detects the slope of the step response on the basis of a filter coefficient of the filter processing portion after the identification of the impulse response.

(6)

The recording adjustment device according to any one of (1) to (5) described above, in which the control portion multiplies a value obtained by dividing the amplitude difference by the slope of the step response by a correction coefficient, thereby calculating the correction amount.

(7)

The recording adjustment device according to (6) described above, in which the correction coefficient is a value which is equal to or larger than 0.3, and equal to or smaller than 0.8.

(8)

A recording adjustment method, including the steps of:

storing a recording pattern of marks and spaces of data recoded in a recording medium in a storage portion;

identifying an impulse response of a system on the basis of a regenerative signal obtained by reproducing the data recorded in the recording medium, and the recording pattern stored in the storage portion by a filter processing portion;

calculating a difference in amplitude between an output from the filter processing portion after the identification of the impulse response, and the regenerative signal every edge type by a calculation portion;

detecting a slope of a step response in a vicinity of an edge position by a detection portion;

calculating a correction amount of an edge position for each edge type on the basis of the amplitude difference and a slope of the step response by a control portion;

correcting the edge position in response to the correction amount, and causing data as a recording target to be recorded in the recording medium by the control portion;

causing the recording pattern of marks and spaces of the data as the recording target to be stored in the storage portion by the control portion; and causing recording compensation processing including at least the processing by the calculation portion, and the processing by the control portion of the processing by the filter processing portion, the processing by the calculation portion, the processing by the detection portion, and the processing by the control portion to be repetitively executed by changing the data becoming a target of reproduction, and the data as the recording target.

(9)

A program in accordance with which a computer executes processing, including the steps of:

storing a recording pattern of marks and spaces of data recoded in a recording medium in a storage portion;

identifying an impulse response of a system on the basis of a regenerative signal obtained by reproducing the data recorded in the recording medium, and the recording pattern stored in the storage portion by a filter processing portion;

calculating a difference in amplitude between an output from the filter processing portion after the identification of the impulse response, and the regenerative signal every edge type by a calculation portion;

detecting a slope of a step response in a vicinity of an edge position by a detection portion;

calculating a correction amount of an edge position for each edge type on the basis of the amplitude difference and the slope of the step response by a control portion;

correcting the edge position in response to the correction amount, and causing data as a recording target to be recorded in the recording medium by the control portion;

causing the recording pattern of marks and spaces of the data as the recording target to be stored in the storage portion by the control portion; and causing recording compensation processing including at least the processing by the calculation portion, and the processing by the control portion of the processing by the filter processing portion, the processing by the calculation portion, the processing by the detection portion, and the processing by the control portion to be repetitively executed by changing the data becoming a target of reproduction, and the data as the recording target.

REFERENCE SIGNS LIST

1 . . . Recording adjustment device, 2 . . . Optical disc, 14 . . . Signal processing portion, 21 . . . Delay adjusting circuit, 22 . . . Recording pattern memory, 23 . . . LMS filter, 24 . . . Delay adjusting circuit, 25 . . . Edge timing generating circuit, 26 . . . Step slope detecting circuit, $27_0$ to $27_{N-1}$ . . . Average value calculating circuit, 28 . . . Register map, 29 . . . Control circuit, 30 . . . Recording strategy generating circuit, 31 . . . Channel encoder

The invention claimed is:

1. A recording adjustment device, comprising:
a storage portion configured to store a recording pattern of marks and spaces of data recoded in a recording medium;
a filter processing portion configured to identify an impulse response of a system on the basis of a regenerative signal obtained by reproducing the data recorded in the recording medium, and the recording pattern stored in the storage portion;
a calculation portion configured to calculate a difference in amplitude between an output from the filter processing portion after the identification of the impulse response, and the regenerative signal every edge type;
a detection portion configured to detect a slope of a step response in a vicinity of an edge position;
a control portion configured to calculate a correction amount of an edge position for each edge type on the basis of the amplitude difference and the slope of the step response, correct the edge position in response to the correction amount, cause data as a recording target to be recorded in the recording medium, and cause the recording pattern of marks and the spaces of the data as the recording target to be stored in the storage portion; and
a processing control portion configured to cause recording compensation processing including at least the processing by the calculation portion, and the processing by the control portion of the processing by the filter processing portion, the processing by the calculation portion, the processing by the detection portion, and the processing by the control portion to be repetitively executed by changing the data becoming a target of reproduction, and the data as the recording target.

2. The recording adjustment device according to claim 1, wherein after the data as the recording target is recorded in the recording medium, the filter processing portion identifies the impulse response of the system on the basis of the regenerative signal obtained by reproducing the data as the recording target recorded in the recording medium, and the recording pattern newly recorded in the storage portion.

3. The recording adjustment device according to claim 1, wherein the data becoming the target of the reproduction is data recorded in the recording medium by the recording compensation processing at the last minute.

4. The recording adjustment device according to claim 1, wherein the detection portion detects a difference between the amplitude of the regenerative signal in an edge position constituted by a mark having a predetermined length or more, and a space having a predetermined length or more, and the amplitude of the regenerative signal in a position shifted at a distance corresponding to one clock from the edge position as the slope of the step response.

5. The recording adjustment device according to claim 1, wherein the detection portion detects the slope of the step response on the basis of a filter coefficient of the filter processing portion after the identification of the impulse response.

6. The recording adjustment device according to claim 1, wherein the control portion multiplies a value obtained by dividing the amplitude difference by the slope of the step response by a correction coefficient, thereby calculating the correction amount.

7. The recording adjustment device according to claim 6, wherein the correction coefficient is a value which is equal to or larger than 0.3, and equal to or smaller than 0.8.

8. A recording adjustment method, comprising the steps of:

storing a recording pattern of marks and spaces of data recoded in a recording medium in a storage portion;

identifying an impulse response of a system on the basis of a regenerative signal obtained by reproducing the data recorded in the recording medium, and the recording pattern stored in the storage portion by a filter processing portion;

calculating a difference in amplitude between an output from the filter processing portion after the identification of the impulse response, and the regenerative signal every edge type by a calculation portion;

detecting a slope of a step response in a vicinity of an edge position by a detection portion;

calculating a correction amount of an edge position for each edge type on the basis of the amplitude difference and the slope of the step response by a control portion;

correcting the edge position in response to the correction amount, and causing data as a recording target to be recorded in the recording medium by the control portion;

causing the recording pattern of marks and spaces of the data as the recording target to be stored in the storage portion by the control portion; and causing recording compensation processing including at least the processing by the calculation portion, and the processing by the control portion of the processing by the filter processing portion, the processing by the calculation portion, the processing by the detection portion, and the processing by the control portion to be repetitively executed by changing the data becoming a target of reproduction, and the data as the recording target.

9. A non-transitory computer-readable medium having embodied thereon a program, which when executed by a computer causes the computer to execute a method, the method comprising:

storing a recording pattern of marks and spaces of data recoded in a recording medium in a storage portion;

identifying an impulse response of a system on the basis of a regenerative signal obtained by reproducing the data recorded in the recording medium, and the recording pattern stored in the storage portion by a filter processing portion;

calculating a difference in amplitude between an output from the filter processing portion after the identification of the impulse response, and the regenerative signal every edge type by a calculation portion;

detecting a slope of a step response in a vicinity of an edge position by a detection portion;

calculating a correction amount of an edge position for each edge type on the basis of the amplitude difference and the slope of the step response by a control portion;

correcting the edge position in response to the correction amount, and causing data as a recording target to be recorded in the recording medium by the control portion;

causing the recording pattern of marks and spaces of the data as the recording target to be stored in the storage portion by the control portion; and causing recording compensation processing including at least the processing by the calculation portion, and the processing by the control portion of the processing by the filter processing portion, the processing by the calculation portion, the processing by the detection portion, and the processing by the control portion to be repetitively executed by changing the data becoming a target of reproduction, and the data as the recording target.

* * * * *